(12) United States Patent
Brothers et al.

(10) Patent No.: US 9,574,027 B2
(45) Date of Patent: Feb. 21, 2017

(54) FLUOROPOLYMER RESIN TREATMENT EMPLOYING SORBENT TO REDUCE FLUOROPOLYMER RESIN DISCOLORATION

(71) Applicant: THE CHEMOURS COMPANY FC LLC, Wilmington, DE (US)

(72) Inventors: Paul Douglas Brothers, Chadds Ford, PA (US); Gregory Allen Chapman, Washington, WV (US); Subhash Vishnu Gangal, Hockessin, DE (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 414 days.

(21) Appl. No.: 14/198,941

(22) Filed: Mar. 6, 2014

(65) Prior Publication Data

US 2014/0256895 A1  Sep. 11, 2014

Related U.S. Application Data

(60) Provisional application No. 61/775,978, filed on Mar. 11, 2013.

(51) Int. Cl.

| | |
|---|---|
| *C08F 114/26* | (2006.01) |
| *C08F 114/14* | (2006.01) |
| *C08F 6/16* | (2006.01) |
| *B01J 41/04* | (2006.01) |
| *B01J 20/14* | (2006.01) |
| *B01J 20/18* | (2006.01) |
| *B01J 20/20* | (2006.01) |
| *B01J 20/26* | (2006.01) |
| *B01J 20/10* | (2006.01) |

(52) U.S. Cl.
CPC ............ *C08F 114/26* (2013.01); *B01J 20/103* (2013.01); *B01J 20/14* (2013.01); *B01J 20/18* (2013.01); *B01J 20/20* (2013.01); *B01J 20/262* (2013.01); *B01J 41/043* (2013.01); *B01J 41/046* (2013.01); *C08F 6/16* (2013.01)

(58) Field of Classification Search
USPC ................................................. 526/255, 254
See application file for complete search history.

(56) References Cited

U.S. PATENT DOCUMENTS

| | | |
|---|---|---|
| 2,784,170 A | 3/1957 | Walter et al. |
| 3,085,083 A | 4/1963 | Schreyer |
| 3,282,875 A | 11/1966 | Connolly et al. |
| 3,391,099 A | 7/1968 | Punderson |
| 3,700,627 A | 10/1972 | Miller |
| 4,036,802 A | 7/1977 | Poirier |
| 4,358,545 A | 11/1982 | Ezzell et al. |
| 4,552,631 A | 11/1985 | Bissot et al. |
| 4,626,587 A | 12/1986 | Morgan et al. |
| 4,675,380 A | 6/1987 | Buckmaster et al. |
| 4,743,658 A | 5/1988 | Imbalzano et al. |
| 4,940,525 A | 7/1990 | Ezzell et al. |
| 5,180,803 A | 1/1993 | Gibbard |
| 5,391,709 A | 2/1995 | Egres, Jr. et al. |
| 5,491,214 A | 2/1996 | Daughenbaugh et al. |
| 5,637,748 A | 6/1997 | Hung et al. |
| 5,703,185 A | 12/1997 | Blair |
| 5,859,086 A | 1/1999 | Freund et al. |
| 6,177,196 B1 | 1/2001 | Brothers et al. |
| 6,300,445 B1 | 10/2001 | Hung et al. |
| 6,664,337 B2 | 12/2003 | Hiraga et al. |
| 6,689,833 B1 | 2/2004 | Bidstrup et al. |
| 6,794,487 B2 | 9/2004 | Hiraga et al. |
| 6,838,545 B2 | 1/2005 | Chapman et al. |
| 7,763,680 B2 | 7/2010 | Aten et al. |
| 8,859,645 B2* | 10/2014 | Poggio ...................... C08F 6/16 210/263 |
| 2004/0084296 A1 | 5/2004 | Hori et al. |
| 2006/0036021 A1 | 2/2006 | Noelke et al. |
| 2006/0175261 A1 | 8/2006 | Noelke et al. |
| 2007/0129500 A1 | 6/2007 | Honda et al. |
| 2009/0221776 A1 | 9/2009 | Durali et al. |
| 2009/0281261 A1* | 11/2009 | Brothers ................... C08F 6/16 526/209 |
| 2010/0204345 A1 | 8/2010 | Yamanaka et al. |
| 2012/0116003 A1 | 5/2012 | Brothers et al. |
| 2013/0303717 A1 | 11/2013 | Brothers et al. |
| 2013/0303718 A1 | 11/2013 | Brothers et al. |

FOREIGN PATENT DOCUMENTS

| | | |
|---|---|---|
| EP | 0469759 A1 | 7/1991 |
| EP | 1170303 A1 | 11/1999 |
| EP | 1043353 A1 | 10/2000 |

(Continued)

OTHER PUBLICATIONS

Zurkinden, Jolanda, Authorized Officer, PCT International Search Report and Written Opinion, PCT/US2014/022400, mailed Jul. 10, 2014.

Gometani, Jo, et al, "Modified Poly(Chlorotrifluoroethylene) and Chlorotrifluoroethylene Copolymer", XP-002713264, May 12, 1984. Chemical Abstracts Service, Columbus, OH.

Tsuda, Nobuhiko et al; "Method for Producing Flurine-Containing Polymer Compositions With Good Coloring Resistance During Processing", XP002702454, Database CA [Online] Chemical Abstracts Service, Columbus, Ohio, US; May 5, 2005 (May 5, 2005).

(Continued)

*Primary Examiner* — Mark Kaucher
*Assistant Examiner* — Henry Hu

(57) ABSTRACT

A process for reducing thermally induced discoloration of fluoropolymer resin produced by polymerizing fluoromonomer in an aqueous dispersion medium to form aqueous fluoropolymer dispersion and isolating the fluoropolymer from the aqueous medium to obtain fluoropolymer resin. The process comprises contacting the aqueous fluoropolymer dispersion with sorbent.

13 Claims, No Drawings

(56) References Cited

FOREIGN PATENT DOCUMENTS

| | | |
|---|---|---|
| EP | 1054023 A1 | 11/2000 |
| EP | 0928673 B1 | 11/2002 |
| EP | 1380605 A1 | 1/2004 |
| EP | 1 714 986 A1 | 4/2006 |
| EP | 1 845 116 A1 | 4/2006 |
| EP | 2 298 726 A1 | 6/2009 |
| FR | 1 140 964 A | 8/1957 |
| FR | 1140964 | 8/1957 |
| FR | 1143777 A | 10/1957 |
| GB | 1210794 | 10/1970 |
| GB | 1299520 | 12/1972 |
| JP | S45 38906 B1 | 12/1970 |
| JP | H11-100543 | 4/1999 |
| JP | 2003082020 A | 3/2003 |
| JP | 2010-229163 A | 10/2010 |
| WO | 2005033150 A1 | 4/2005 |
| WO | 2009014138 A1 | 1/2009 |

OTHER PUBLICATIONS

Sagisaka, Shigehito et al; Method for Producing Purified Fluorine-Containing Polymer; XP002712775, Database CA [Online] Chemical Abstracts Service, Columbus, Ohio, US; Jan. 30, 2009 (Jan. 30, 2009).

* cited by examiner

FLUOROPOLYMER RESIN TREATMENT EMPLOYING SORBENT TO REDUCE FLUOROPOLYMER RESIN DISCOLORATION

FIELD OF THE INVENTION

This invention relates to a process for reducing thermally induced discoloration of fluoropolymer resin.

BACKGROUND OF THE INVENTION

A typical process for the aqueous dispersion polymerization of fluorinated monomer to produce fluoropolymer includes feeding fluorinated monomer to a heated reactor containing an aqueous medium and adding a free-radical initiator to commence polymerization. A fluorosurfactant is typically employed to stabilize the fluoropolymer particles formed. After several hours, the feeds are stopped, the reactor is vented and purged with nitrogen, and the raw dispersion in the vessel is transferred to a cooling vessel.

The fluoropolymer formed can be isolated from the dispersion to obtain fluoropolymer resin. For example, polytetrafluoroethylene (PTFE) resin referred to as PTFE fine powder is produced by isolating PTFE resin from PTFE dispersion by coagulating the dispersion to separate PTFE from the aqueous medium and then drying. Dispersions of melt-processible fluoropolymers such as copolymers of tetrafluoroethylene and hexafluoropropylene (FEP) and tetrafluoroethylene and perfluoro (alkyl vinyl ethers) (PFA) useful as molding resins can be similarly coagulated and the coagulated polymer is dried and then used directly in melt-processing operations or melt-processed into a convenient form such as chip or pellet for use in subsequent melt-processing operations.

Because of environmental concerns relating to fluorosurfactants, there is interest in using hydrocarbon surfactants in the aqueous polymerization medium in place of a portion of or all of the fluorosurfactant. However, when fluoropolymer dispersion is formed which contains hydrocarbon surfactant and is subsequently isolated to obtain fluoropolymer resin, the fluoropolymer resin is prone to thermally induced discoloration. By thermally induced discoloration is meant that undesirable color forms or increases in the fluoropolymer resin upon heating. It is usually desirable for fluoropolymer resin to be clear or white in color and, in resin prone to thermally induced discoloration, a gray or brown color, sometimes quite dark forms upon heating. For example, if PTFE fine power produced from dispersion containing the hydrocarbon surfactant sodium dodecyl sulfate (SDS) is converted into paste-extruded shapes or films and subsequently sintered, an undesirable gray or brown color will typically arise. Color formation upon sintering in PTFE produced from dispersion containing the hydrocarbon surfactant SDS has been described in Example VI of U.S. Pat. No. 3,391,099 to Punderson. Similarly, when melt processible fluoropolymers such as FEP or PFA are produced from dispersions containing hydrocarbon surfactant such as SDS, undesirable color typically occurs when the fluoropolymer is first melt-processed, for example, when melt processed into a convenient form for subsequent use such as chip or pellet.

SUMMARY OF THE INVENTION

The invention provides a process for reducing thermally induced discoloration of fluoropolymer resin which is produced by polymerizing fluoromonomer in an aqueous dispersion medium to form aqueous fluoropolymer dispersion and isolating the fluoropolymer from the aqueous medium to obtain fluoropolymer resin. It has been discovered that thermally induced discoloration of fluoropolymer resin can be reduced by:

contacting the aqueous fluoropolymer dispersion with sorbent.

Preferably, the process reduces thermally induced discoloration by at least about 10% as measured by % change in $L^*$ on the CIELAB color scale.

The process of the invention is useful for fluoropolymer resin which exhibits thermally induced discoloration which ranges from mild to severe.

The process of the invention may be employed for fluoropolymer resin which exhibits thermally induced discoloration prior to treatment which is significantly greater than equivalent fluoropolymer resin of commercial quality manufactured using ammonium perfluorooctanoate fluorosurfactant. The process of the invention is advantageously employed when the fluoropolymer resin has an initial thermally induced discoloration value ($L^*_i$) at least about 4 L units on the CIELAB color scale below the $L^*$ value of equivalent fluoropolymer resin of commercial quality manufactured using ammonium perfluorooctanoate fluorosurfactant.

The invention is particularly useful for fluoropolymer resin containing hydrocarbon surfactant which causes thermally induced discoloration, preferably aqueous fluoropolymer dispersion polymerized in the presence of hydrocarbon surfactant.

DETAILED DESCRIPTION OF THE INVENTION

Fluoromonomer/Fluoropolymer

Fluoropolymer resins are produced by polymerizing fluoromonomer in an aqueous medium to form aqueous fluoropolymer dispersion. The fluoropolymer is made from at least one fluorinated monomer (fluoromonomer), i.e., wherein at least one of the monomers contains fluorine, preferably an olefinic monomer with at least one fluorine or a fluoroalkyl group attached to a doubly-bonded carbon. The fluorinated monomer and the fluoropolymer obtained therefrom each preferably contain at least 35 wt % F, preferably at least 50 wt % F and the fluorinated monomer is preferably independently selected from the group consisting of tetrafluoroethylene (TFE), hexafluoropropylene (HFP), chlorotrifluoroethylene (CTFE), trifluoroethylene, hexafluoroisobutylene, perfluoroalkyl ethylene, fluorovinyl ethers, vinyl fluoride (VF), vinylidene fluoride (VF2), perfluoro-2,2-dimethyl-1,3-dioxole (PDD), perfluoro-2-methylene-4-methyl-1,3-dioxolane (PMD), perfluoro(allyl vinyl ether) and perfluoro(butenyl vinyl ether) and mixtures thereof. A preferred perfluoroalkyl ethylene monomer is perfluorobutyl ethylene (PFBE). Preferred fluorovinyl ethers include perfluoro(alkyl vinyl ether) monomers (PAVE) such as perfluoro(propyl vinyl ether) (PPVE), perfluoro(ethyl vinyl ether) (PEVE), and perfluoro(methyl vinyl ether) (PMVE). Non-fluorinated olefinic comonomers such as ethylene and propylene can be copolymerized with fluorinated monomers.

Fluorovinyl ethers also include those useful for introducing functionality into fluoropolymers. These include $CF_2=CF-(O-CF_2CFR_f)_a-O-CF_2CFR'_fSO_2F$, wherein $R_f$ and $R'_f$ are independently selected from F, Cl or a perfluorinated alkyl group having 1 to 10 carbon atoms, a=0, 1 or 2. Polymers of this type are disclosed in U.S. Pat. No. 3,282,875 $(CF_2=CF-O-CF_2CF(CF_3)-O-$ CF$_2$CF$_2$SO$_2$F, perfluoro(3,6-dioxa-4-methyl-7-octenesulfonyl fluoride)), and in U.S. Pat. Nos. 4,358,545 and 4,940,525 (CF$_2$=CF—O—CF$_2$CF$_2$SO$_2$F). Another example is CF$_2$=CF—O—CF$_2$—CF(CF$_3$)—O—CF$_2$CF$_2$CO$_2$CH$_3$, methyl ester of perfluoro(4,7-dioxa-5-methyl-8-nonenecarboxylic acid), disclosed in U.S. Pat. No. 4,552,631. Similar fluorovinyl ethers with functionality of nitrile, cyanate, carbamate, and phosphonic acid are disclosed in U.S. Pat. Nos. 5,637,748; 6,300,445; and 6,177,196.

A preferred class of fluoropolymers useful for reducing thermally induced discoloration is perfluoropolymers in which the monovalent substituents on the carbon atoms forming the chain or backbone of the polymer are all fluorine atoms, with the possible exception of comonomer, end groups, or pendant group structure. Preferably the comonomer, end group, or pendant group structure will impart no more than 2 wt % C—H moiety, more preferably no greater than 1 wt % C—H moiety, with respect to the total weight of the perfluoropolymer. Preferably, the hydrogen content, if any, of the perfluoropolymer is no greater than 0.2 wt %, based on the total weight of the perfluoropolymer.

The invention is useful for reducing thermally induced discoloration of fluoropolymers of polytetrafluoroethylene (PTFE) including modified PTFE. Polytetrafluoroethylene (PTFE) refers to (a) the polymerized tetrafluoroethylene by itself without any significant comonomer present, i.e. homopolymer and (b) modified PTFE, which is a copolymer of TFE having such small concentrations of comonomer that the melting point of the resultant polymer is not substantially reduced below that of PTFE. The modified PTFE contains a small amount of comonomer modifier which reduces crystallinity to improve film forming capability during baking (fusing). Examples of such monomers include perfluoroolefin, notably hexafluoropropylene (HFP) or perfluoro (alkyl vinyl ether) (PAVE), where the alkyl group contains 1 to 5 carbon atoms, with perfluoro(ethyl vinyl ether) (PEVE) and perfluoro(propyl vinyl ether) (PPVE) being preferred, chlorotrifluoroethylene (CTFE), perfluorobutyl ethylene (PFBE), or other monomer that introduces bulky side groups into the polymer molecule. The concentration of such comonomer is preferably less than 1 wt %, more preferably less than 0.5 wt %, based on the total weight of the TFE and comonomer present in the PTFE. A minimum amount of at least about 0.05 wt % is preferably used to have significant effect. PTFE (and modified PTFE) typically have a melt creep viscosity of at least about 1×10$^6$ Pa·s and preferably at least 1×10$^8$ Pa·s and, with such high melt viscosity, the polymer does not flow in the molten state and therefore is not a melt-processible polymer. The measurement of melt creep viscosity is disclosed in col. 4 of U.S. Pat. No. 7,763,680. The high melt viscosity of PTFE arises from is extremely high molecular weight (Mn), e.g. at least 10$^6$. PTFE can also be characterized by its high melting temperature, of at least 330° C., upon first heating. The non-melt flowability of the PTFE, arising from its extremely high melt viscosity, results in a no melt flow condition when melt flow rate (MFR) is measured in accordance with ASTM D 1238 at 372° C. and using a 5 kg weight, i.e., MFR is O. The high molecular weight of PTFE is characterized by measuring its standard specific gravity (SSG). The SSG measurement procedure (ASTM D 4894, also described in U.S. Pat. No. 4,036,802) includes sintering of the SSG sample free standing (without containment) above its melting temperature without change in dimension of the SSG sample. The SSG sample does not flow during the sintering.

The process of the present invention is also useful in reducing thermally induced discoloration of low molecular weight PTFE, which is commonly known as PTFE micropowder, so as to distinguish from the PTFE described above. The molecular weight of PTFE micropowder is low relative to PTFE, i.e. the molecular weight (Mn) is generally in the range of 10$^4$ to 10$^5$. The result of this lower molecular weight of PTFE micropowder is that it has fluidity in the molten state, in contrast to PTFE which is not melt flowable. PTFE micropowder has melt flowability, which can be characterized by a melt flow rate (MFR) of at least 0.01 g/10 min, preferably at least 0.1 g/10 min and more preferably at least 5 g/10 min, and still more preferably at least 10 g/10 min., as measured in accordance with ASTM D 1238, at 372° C. using a 5 kg weight on the molten polymer.

The invention is especially useful for reducing thermally induced discoloration of melt-processible fluoropolymers that are also melt-fabricable. Melt-processible means that the fluoropolymer can be processed in the molten state, i.e., fabricated from the melt using conventional processing equipment such as extruders and injection molding machines, into shaped articles such as films, fibers, and tubes. Melt-fabricable means that the resultant fabricated articles exhibit sufficient strength and toughness to be useful for their intended purpose. This sufficient strength may be characterized by the fluoropolymer by itself exhibiting an MIT Flex Life of at least 1000 cycles, preferably at least 2000 cycles, measured as disclosed in U.S. Pat. No. 5,703,185. The strength of the fluoropolymer is indicated by it not being brittle.

Examples of such melt-processible fluoropolymers include homopolymers such as polychlorotrifluoroethylene and polyvinylidene fluoride (PVDF) or copolymers of tetrafluoroethylene (TFE) and at least one fluorinated copolymerizable monomer (comonomer) present in the polymer usually in sufficient amount to reduce the melting point of the copolymer substantially below that of PTFE, e.g., to a melting temperature no greater than 315° C.

A melt-processible TFE copolymer typically incorporates an amount of comonomer into the copolymer in order to provide a copolymer which has a melt flow rate (MFR) of 0.1 to 200 g/10 min as measured according to ASTM D-1238 using a 5 kg weight on the molten polymer and the melt temperature which is standard for the specific copolymer. MFR will preferably range from 1 to 100 g/10 min, most preferably about 1 to about 50 g/10 min. Additional melt-processible fluoropolymers are the copolymers of ethylene (E) or propylene (P) with TFE or CTFE, notably ETFE and ECTFE.

A preferred melt-processible copolymer for use in the practice of the present invention comprises at least 40-99 mol % tetrafluoroethylene units and 1-60 mol % of at least one other monomer. Additional melt-processible copolymers are those containing 60-99 mol % PTFE units and 1-40 mol % of at least one other monomer. Preferred comonomers with TFE to form perfluoropolymers are perfluoromonomers, preferably perfluoroolefin having 3 to 8 carbon atoms, such as hexafluoropropylene (HFP), and/or perfluoro(alkyl vinyl ether) (PAVE) in which the linear or branched alkyl group contains 1 to 5 carbon atoms. Preferred PAVE monomers are those in which the alkyl group contains 1, 2, 3 or 4 carbon atoms, and the copolymer can be made using several PAVE monomers. Preferred TFE copolymers include FEP (TFE/HFP copolymer), PFA (TFE/PAVE copolymer), TFE/HFP/PAVE wherein PAVE is PEVE and/or PPVE, MFA (TFE/PMVE/PAVE wherein the alkyl group of PAVE has at least two carbon atoms) and THV (TFE/HFP/VF$_2$).

All these melt-processible fluoropolymers can be characterized by MFR as recited above for the melt-processible TFE copolymers, i.e. by the procedure of ASTM 1238 using standard conditions for the particular polymer, including a 5 kg weight on the molten polymer in the plastometer for the MFR determination of PFA and FEP Further useful polymers are film forming polymers of polyvinylidene fluoride (PVDF) and copolymers of vinylidene fluoride as well as polyvinyl fluoride (PVF) and copolymers of vinyl fluoride.

The invention is also useful when reducing thermally induced discoloration of fluorocarbon elastomers (fluoroelastomers). These elastomers typically have a glass transition temperature below 25° C. and exhibit little or no crystallinity at room temperature and little or no melting temperature. Fluoroelastomer made by the process of this invention typically are copolymers containing 25 to 75 wt %, based on total weight of the fluoroelastomer, of copolymerized units of a first fluorinated monomer which may be vinylidene fluoride ($VF_2$) or tetrafluoroethylene (TFE). The remaining units in the fluoroelastomers are comprised of one or more additional copolymerized monomers, different from the first monomer, selected from the group consisting of fluorinated monomers, hydrocarbon olefins and mixtures thereof. Fluoroelastomers may also, optionally, comprise units of one or more cure site monomers. When present, copolymerized cure site monomers are typically at a level of 0.05 to 7 wt %, based on total weight of fluorocarbon elastomer. Examples of suitable cure site monomers include: i) bromine-, iodine-, or chlorine-containing fluorinated olefins or fluorinated vinyl ethers; ii) nitrile group-containing fluorinated olefins or fluorinated vinyl ethers; iii) perfluoro (2-phenoxypropyl vinyl ether); and iv) non-conjugated dienes.

Preferred TFE based fluoroelastomer copolymers include TFE/PMVE, TFE/PMVE/E, TFE/P and TFE/P/$VF_2$. Preferred $VF_2$ based fluorocarbon elastomer copolymers include $VF_2$/HFP, $VF_2$/HFP/TFE, and $VF_2$/PMVE/TFE. Any of these elastomer copolymers may further comprise units of cure site monomer.

Hydrocarbon Surfactants

In one embodiment of the present invention, the aqueous fluoropolymer dispersion contains hydrocarbon surfactant which causes thermally induced discoloration in the resin when the fluoropolymer resin is isolated and heated. The hydrocarbon surfactant is a compound that has hydrophobic and hydrophilic moieties, which enables it to disperse and stabilize hydrophobic fluoropolymer particles in an aqueous medium. The hydrocarbon surfactant is preferably an anionic surfactant. An anionic surfactant has a negatively charged hydrophilic portion such as a carboxylate, sulfonate, or sulfate salt and a long chain hydrocarbon portion, such as alkyl as the hydrophobic portion. Hydrocarbon surfactants often serve to stabilize polymer particles by coating the particles with the hydrophobic portion of the surfactant oriented towards the particle and the hydrophilic portion of the surfactant in the water phase. The anionic surfactant adds to this stabilization because it is charged and provides repulsion of the electrical charges between polymer particles. Surfactants typically reduce surface tension of the aqueous medium containing the surfactant significantly.

One example anionic hydrocarbon surfactant is the highly branched C10 tertiary carboxylic acid supplied as Versatic® 10 by Resolution Performance Products.

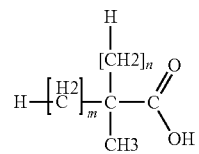

Versatic® 10
Neodecanoic acid ($n + m = 7$)

Another useful anionic hydrocarbon surfactant is the sodium linear alkyl polyether sulfonates supplied as the Avanel® S series by BASF. The ethylene oxide chain provides nonionic characteristics to the surfactant and the sulfonate groups provide certain anionic characteristics.

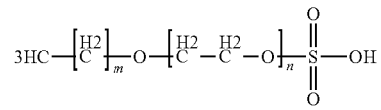

Avanel®
S-70 ($n = 7, m = 11\text{-}14$)
S-74 ($n = 3, m = 8$)

Another group of hydrocarbon surfactants are those anionic surfactants represented by the formula R-L-M wherein R is preferably a straight chain alkyl group containing from 6 to 17 carbon atoms, L is selected from the group consisting of —$ArSO_3^-$, —$SO_3^-$, —$SO_4^-$, —$PO_3^-$, —$PO_4^-$ and —$COO^-$, and M is a univalent cation, preferably $H^+$, $Na^+$, $K^+$ and $NH_4^+$. —$ArSO_3^-$ is aryl sulfonate. Preferred of these surfactants are those represented by the formula $CH_3$—$(CH_2)_n$-L-M, wherein n is an integer of 6 to 17 and L is selected from —$SO_4M$, —$PO_3M$, —$PO_4M$, or —COOM and L and M have the same meaning as above. Especially preferred are R-L-M surfactants wherein the R group is an alkyl group having 12 to 16 carbon atoms and wherein L is sulfate, and mixtures thereof. Especially preferred of the R-L-M surfactants is sodium dodecyl sulfate (SDS). For commercial use, SDS (sometimes referred to as sodium lauryl sulfate or SLS), is typically obtained from coconut oil or palm kernel oil feedstocks, and contains predominately sodium dodecyl sulfate but may contain minor quantities of other R-L-M surfactants with differing R groups. "SDS" as used in this application means sodium dodecyl sulfate or surfactant mixtures which are predominantly sodium docecyl sulphate containing minor quantities of other R-L-M surfactants with differing R groups.

Another example of anionic hydrocarbon surfactant useful in the present invention is the sulfosuccinate surfactant Lankropol® K8300 available from Akzo Nobel Surface Chemistry LLC. The surfactant is reported to be the following:

Butanedioic acid, sulfo-, 4-(1-methyl-2-((1-oxo-9-octadecenyl)amino)ethyl) ester, disodium salt; CAS No.:67815-88-7

Additional sulfosuccinate hydrocarbon surfactants useful in the present invention are diisodecyl sulfosuccinate, Na salt, available as Emulsogen® SB10 from Clariant, and diisotridecyl sulfosuccinate, Na salt, available as Polirol® TR/LNA from Cesapinia Chemicals.

Another preferred class of hydrocarbon surfactants is nonionic surfactants. A nonionic surfactant does not contain a charged group but has a hydrophobic portion that is typically a long chain hydrocarbon. The hydrophilic portion of the nonionic surfactant typically contains water soluble functionality such as a chain of ethylene ether derived from polymerization with ethylene oxide. In the stabilization context, surfactants stabilize polymer particles by coating the particles with the hydrophobic portion of the surfactant oriented towards the particle and the hydrophilic portion of the surfactant in the water phase.

Nonionic hydrocarbon surfactants include polyoxyethylene alkyl ethers, polyoxyethylene alkyl phenyl ethers, polyoxyethylene alkyl esters, sorbitan alkyl esters, polyoxyethylene sorbitan alkyl esters, glycerol esters, their derivatives and the like. More specifically examples of polyoxyethylene alkyl ethers are polyoxyethylene lauryl ether, polyoxyethylene cetyl ether, polyoxyethylene stearyl ether, polyoxyethylene oleyl ether, polyoxyethylene behenyl ether and the like; examples of polyoxyethylene alkyl phenyl ethers are polyoxyethylene nonyl phenyl ether, polyoxyethylene octyl phenyl ether and the like; examples of polyoxyethylene alkyl esters are polyethylene glycol monolaurylate, polyethylene glycol monooleate, polyethylene glycol monostearate and the like; examples of sorbitan alkyl esters are polyoxyethylene sorbitan monolaurylate, polyoxyethylene sorbitan monopalmitate, polyoxyethylene sorbitan monostearate, polyoxyethylene sorbitan monooleate and the like; examples of polyoxyethylene sorbitan alkyl esters are polyoxyethylene sorbitan monolaurylate, polyoxyethylene sorbitan monopalmitate, polyoxyethylene sorbitan monostearate and the like; and examples of glycerol esters are glycerol monomyristate, glycerol monostearate, glycerol monooleate and the like. Also examples of their derivatives are polyoxyethylene alkyl amine, polyoxyethylene alkyl phenyl-formaldehyde condensate, polyoxyethylene alkyl ether phosphate and the like. Particularly preferable are polyoxyethylene alkyl ethers and polyoxyethylene alkyl esters. Examples of such ethers and esters are those that have an HLB value of 10 to 18. More particularly there are polyoxyethylene lauryl ether (EO: 5 to 20. EO stands for an ethylene oxide unit.), polyethylene glycol monostearate (EO: 10 to 55) and polyethylene glycol monooleate (EO: 6 to 10).

Suitable nonionic hydrocarbon surfactants include octyl phenol ethoxylates such as the Triton® X series supplied by Dow Chemical Company:

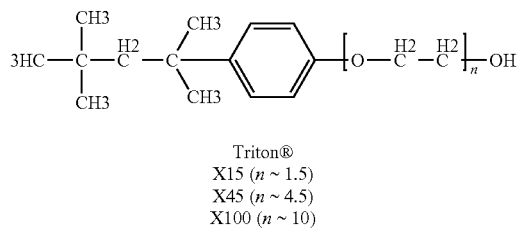

Triton®
X15 (n ~ 1.5)
X45 (n ~ 4.5)
X100 (n ~ 10)

Preferred nonionic hydrocarbon surfactants are branched alcohol ethoxylates such as the Tergitol® 15-S series supplied by Dow Chemical Company and branched secondary alcohol ethoxylates such as the Tergitol® TMN series also supplied by Dow Chemical Company.:

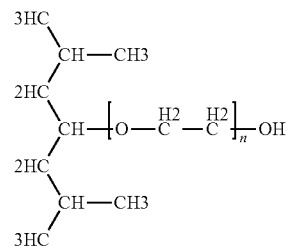

Tergitol®
TMN-6 (n ~ 8)
TMN-10 (n ~ 11)
TMN-100 (n ~ 10)

Ethyleneoxide/propylene oxide copolymers such as the Tergitol® L series surfactant supplied by Dow Chemical Company are also useful as nonionic surfactants in this invention.

Yet another useful group of suitable nonionic hydrocarbon surfactants are difunctional block copolymers supplied as Pluronic® R series from BASF, such as:

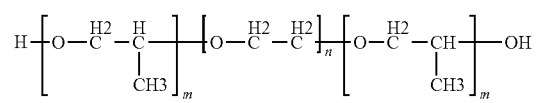

Pluronic® R
31R1 (m ~ 26, n ~ 8)
17R2 (m ~ 14, n ~ 9)
10R5 (m ~ 8, n ~ 22)
25R4 (m ~ 22, n ~ 23)

Another group of suitable nonionic hydrocarbon surfactants are tridecyl alcohol alkoxylates supplied as Iconol® TDA series from BASF Corporation.

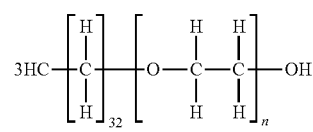

Iconol®
TDA-6 (n = 6)
TDA-9 (n = 9)
TDA-10 (n = 10)

In a preferred embodiment, all of the monovalent substituents on the carbon atoms of the hydrocarbon surfactants are hydrogen. The hydrocarbon is surfactant is preferably essentially free of halogen substituents, such as fluorine or chlorine. Accordingly, the monovalent substituents, as elements from the Periodic Table, on the carbon atoms of the surfactant are at least 75%, preferably at least 85%, and more preferably at least 95% hydrogen. Most preferably, 100% of the monovalent substituents as elements of the Periodic Table, on the carbon atoms are hydrogen. However, in one embodiment, a number of carbon atoms can contain halogen atoms in a minor amount.

Examples of hydrocarbon-containing surfactants useful in the present invention in which only a minor number of monovalent substituents on carbon atoms are fluorine instead of hydrogen are the PolyFox® surfactants available from Omnova Solutions, Inc., described below

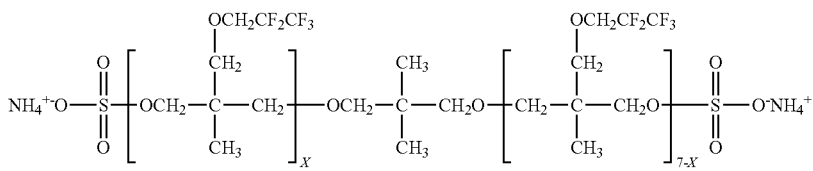

PolyFox™ PF-156A
MW ~ 1900, X = 1 to 7

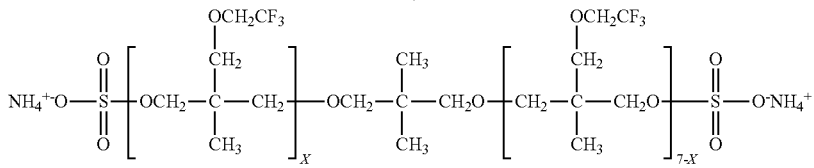

PolyFox™ PF-136A
MW ~ 1600, X = 1 to 7

Polymerization Process

For the practice of the present invention, fluoropolymer resin is produced by polymerizing fluoromonomer. Polymerization may be suitably carried out in a pressurized polymerization reactor which produces aqueous fluoropolymer dispersion. A batch or continuous process may be used although batch processes are more common for commercial production. The reactor is preferably equipped with a stirrer for the aqueous medium and a jacket surrounding the reactor so that the reaction temperature may be conveniently controlled by circulation of a controlled temperature heat exchange medium. The aqueous medium is preferably deionized and deaerated water. The temperature of the reactor and thus of the aqueous medium will preferably be from about 25 to about 120° C.

To carry out polymerization, the reactor is typically pressured up with fluoromonomer to increase the reactor internal pressure to operating pressure which is generally in the range of about 30 to about 1000 psig (0.3 to 7.0 MPa). An aqueous solution of free-radical polymerization initiator can then be pumped into the reactor in sufficient amount to cause kicking off of the polymerization reaction, i.e. commencement of the polymerization reaction. The polymerization initiator employed is preferably a water-soluble free-radical polymerization initiator. For polymerization of TFE to PTFE, preferred initiator is organic peracid such as disuccinic acid peroxide (DSP), which requires a large amount to cause kickoff, e.g. at least about 200 ppm, together with a highly active initiator, such as inorganic persulfate salt such as ammonium persulfate in a smaller amount. For TFE copolymers such FEP and PFA, inorganic persulfate salt such as ammonium persulfate is generally used. The initiator added to cause kickoff can be supplemented by pumping additional initiator solution into the reactor as the polymerization reaction proceeds.

For the production of modified PTFE and TFE copolymers, relatively inactive fluoromonomer such as hexafluoropropylene (HFP) can already be present in the reactor prior to pressuring up with the more active TFE fluoromonomer. After kickoff, TFE is typically fed into the reactor to maintain the internal pressure of the reactor at the operating pressure. Additional comonomer such as HFP or prefluoro (alkyl vinyl ether) can be pumped into the reactor if desired. The aqueous medium is typically stirred to obtain a desired polymerization reaction rate and uniform incorporation of comonomer, if present. Chain transfer agents can be introduced into the reactor when molecular weight control is desired.

In one embodiment of the present invention, the aqueous fluoropolymer dispersion is polymerized in the presence of hydrocarbon surfactant. Hydrocarbon surfactant is preferably present in the fluoropolymer dispersion because the aqueous fluoropolymer dispersion is polymerized in the presence of hydrocarbon surfactant, i.e., hydrocarbon surfactant is used as a stabilizing surfactant during polymerization. If desired fluorosurfactant such a fluoroalkane carboxylic acid or salt or fluoroether carboxylic acid or salt may be employed as stabilizing surfactant together with hydrocarbon surfactant and therefore may also present in the aqueous fluoropolymer dispersion produced. Preferably for the practice of the present invention, the fluoropolymer dispersion is preferably free of halogen-containing surfactant such as fluorosurfactant, i.e., contains less than about 300 ppm, and more preferably less than about 100 ppm, and most preferably less than 50 ppm, or halogen-containing surfactant.

In a polymerization process employing hydrocarbon surfactant as the stabilizing surfactant, addition of the stabilizing surfactant is preferably delayed until after the kickoff has occurred. The amount of the delay will depend on the surfactant being used and the fluoromonomer being polymerized. In addition, it is preferably for the hydrocarbon surfactant to be fed into the reactor as the polymerization proceeds, i.e., metered. The amount of hydrocarbon surfactant present in the aqueous fluoropolymer dispersion produced is preferably 10 ppm to about 50,000 ppm, more preferably about 50 ppm to about 10,000 ppm, most preferably about 100 ppm to about 5000 ppm, based on fluoropolymer solids.

If desired, the hydrocarbon surfactant can be passivated prior to, during or after addition to the polymerization reactor. Passivating means to reduce the telogenic behavior of the hydrocarbon-containing surfactant. Pasivation may be carried out by reacting the hydrocarbon-containing surfactant with an oxidizing agent, preferably hydrogen peroxide or polymerization initiator. Preferably, the passivating of the hydrocarbon-containing surfactant is carried out in the presence of a passivation adjuvant, preferably metal in the form of metal ion, most preferably, ferrous ion or cuprous ion.

After completion of the polymerization when the desired amount of dispersed fluoropolymer or solids content has been achieved (typically several hours in a batch process), the feeds are stopped, the reactor is vented, and the raw dispersion of fluoropolymer particles in the reactor is transferred to a cooling or holding vessel.

The solids content of the aqueous fluoropolymer dispersion as polymerized produced can range from about 10% by weight to up to about 65 wt % by weight but typically is about 15% by weight to 45% by weight. Particle size (Dv(50)) of the fluoropolymer particles in the aqueous fluoropolymer dispersion can range from 10 nm to 400 nm, preferably Dv(50) about 100 to about 400 nm.

Isolation of the fluoropolymer includes separation of wet fluoropolymer resin from the aqueous fluoropolymer dispersion. Separation of the wet fluoropolymer resin from the aqueous fluoropolymer dispersion can be accomplished by a variety of techniques including but not limited to gelation, coagulation, freezing and thawing, and solvent aided pelletization (SAP). When separation of wet fluoropolymer resin is carried out by coagulation, the as polymerized dispersion may first be diluted from its as polymerized concentration. Stirring is then suitably employed to impart sufficient shear to the dispersion to cause coagulation and thereby produce undispersed fluoropolymer. Salts such as ammonium carbonate can be added to the dispersion to assist with coagulation if desired. Filtering can be used to remove at least a portion of the aqueous medium from the wet fluoropolymer resin. Separation can be performed by solvent aided pelletization as described in U.S. Pat. No. 4,675,380 which produces granulated particles of fluoropolymer.

Isolating the fluoropolymer typically includes drying to remove aqueous medium which is retained in the fluoropolymer resin. After wet fluoropolymer resin is separated from the dispersion, fluoropolymer resin in wet form can include significant quantities of the aqueous medium, for example, up to 60% by weight. Drying removes essentially all of the aqueous medium to produce fluoropolymer resin in dry form. The wet fluoropolymer resin may be rinsed if desired and may be pressed to reduce aqueous medium content to reduce the energy and time required for drying.

For melt processible fluoropolymers, wet fluoropolymer resin is dried and used directly in melt-processing operations or processed into a convenient form such as chip or pellet for use in subsequent melt-processing operations. Certain grades of PTFE dispersion are made for the production of fine powder. For this use, the dispersion is coagulated, the aqueous medium is removed and the PTFE is dried to produce fine powder. For fine powder, conditions are suitably employed during isolation which do not adversely affect the properties of the PTFE for end use processing. The shear in the dispersion during stirring is appropriately controlled and temperatures less than 200° C., well below the sintering temperature of PTFE, are employed during drying.

Reduction of Thermally Induced Discoloration

To reduce thermally induced discoloration in accordance with the present invention, the process comprises contacting the aqueous fluoropolymer dispersion with sorbent. Preferably, the process of the invention reduces the thermally induced discoloration by at least about 10% as measured by % change in L* on the CIELAB color scale. As discussed in detail in the Test Methods which follow, the % change in L* of fluoropolymer resin samples is determined using the CIELAB color scale specified by International Commission on Illumination (CIE). More preferably, the process reduces the thermally induced discoloration by at least about 20% as measured by % change in L*, still more preferably at least about 30%, and most preferably at least about 50%.

By the term "sorbent" is meant a material which is capable, when contacted with the aqueous fluoropolymer dispersion, of removing compounds which cause thermally induced discoloration of fluoropolymer resin, e.g., hydrocarbon surfactant. Sorbents useful for the practice of the invention can be in any of various physical forms such as particles or larger structures having porosity which provide sufficient surface area to be effective as a sorbent. The term sorbent is not intended to be limited in any way by the mechanism or mode of operation and a sorbent may operate by adsorption, absorption, or any other mechanism which by contacting aqueous fluoropolymer dispersion achieves removal of compounds which cause thermally induced discoloration of fluoropolymer resin.

Preferred sorbents are in the form of particles to provide increased surface area since increasing the surface area generally increases the rate of sorption and/or capacity of the sorbent for color forming compounds. Particulate sorbents can have any shape such as beads, spheres, cylinders, rods, etc., and may include mixtures of such shapes. The sorbent particles preferably are porous to further increase surface area. Porous particles can enable the use of a larger particle sizes to facilitate handling and use as a sorbent. Depending upon the type of sorbent and the porosity of the particles, the size of the particles can vary and preferably the number average particles size in the range of about 0.05 mm to about 20 mm. Depending upon the type, the surface area of the sorbent can vary widely and preferably is in the range of about 10 $m^2/g$ to about 3000 $m^2/g$.

Sorbents useful for the practice of the invention include activated carbon, ion exchange resin, silica gel, polymer sorbents, diatomaceous earth, zeolites, clays, and bonded silica. Preferred sorbents are activated carbon, ion exchange resin, silica gel, polymer sorbents, diatomaceous earth and zeolites. One especially preferred sorbent is activated carbon. Another especially preferred sorbent is ion exchange resin.

Activated carbon is available in a variety of forms such a powdered, granular and extruded (extruded activated carbon includes a binder to form larger shapes from particles). Granular activated carbon sold for use in water treatment applications is suitable for use in the practice of the present invention. Suitable granular activated carbon is, for example, Calgon DSR-C8X30 and Calgon Filtrasorb® 400 available from the Calgon Carbon Corporation of Pittsburgh, Pa.

Ion exchange resin, especially anion exchange resin, can be particularly effective when anionic hydrocarbon surfactant which causes the thermally induced discoloration is present in the fluoropolymer dispersion. Useful anion exchange resins include strong base as well as weak basic anion exchange resins. Suitable weakly basic anion exchange resins contain primary, secondary amine, or tertiary amine groups. Suitable strongly basic anion exchange resins contain quaternary ammonium groups. Although weakly basic resins are useful because they can be regenerated more easily, strongly base resins can reduce compounds which cause discoloration to lower levels and provide high utilization of the resin. Strongly basic anion exchange resins also have the advantage of less sensitivity to the pH of the media. Strongly basic anion exchange resins have an associated counter ion and are typically available in chloride or hydroxyl ion form but are readily converted to other forms if desired. Examples of suitable commercially-available strong base anion exchange resins with quaternary ammonium groups with a trimethylamine moiety include Dowex® 550A, Siemens A-464-OH, Sybron M-500-OH, Sybron ASB1-OH, Purolite A-500-OH, Itochu TSA 1200, Amberlite® IR 402. Examples of suitable commercially-available stong base anion exchange resins with quaternary ammonium groups with a dimethyl ethanol amine moiety include Siemens A-244-OH, Amberlite® 410, Dowex® Marathon A2, and Dowex® Upcore Mono A2.

Silica gel suitable for the practice of the invention is commercially available. One example is Grace Davison Grade 408 silica gel available from Grace Davison of Baltimore, Md.

Polymer sorbents useful for the practice of the present invention are highly porous polymeric resin beads with internal surfaces which can adsorb compounds which cause thermally induced discoloration. A variety of polymers are used in polymer sorbents such as styrene divinyl benzene, ethylene dimethacrylate, methacrylate styrene, etc. Examples of suitable polymeric adsorbents are Amberlite® XAD-2, Amberlite® XAD-16 and Amberlite® XAD-1180 available from Dow Chemical, Midland, Mich.

Diatomaceous earth suitable for the practice of the invention is commercially available in various forms. One example is the diatomaceous earth sold as course filter aid such as Celite® 545 available from Sigma Aldrich of St. Louis, Mo.

Zeolites are microporous, aluminosilicate minerals commonly used as commercial adsorbents. They are also known as "molecular sieves" since they have the ability to selectively sort molecules based primarily on a size exclusion process. Commercially available zeolites are suitable for the practice of the present invention, for example, Grace Davison Zeolite A available from Grace Davison of Baltimore, Md.

For the practice of the present invention, the solids content of the aqueous fluoropolymer dispersion during the contacting with sorbent is preferably about 2 weight percent to about 60 weight percent. It can be advantageous to dilute the as polymerized dispersion with water to a concentration less than the concentration of the as polymerized aqueous fluoropolymer dispersion. Preferred concentrations are about 2 weight percent to about 30 weight percent, more preferably about 2 weight percent to about 20 weight percent.

Preferably, the temperature during the contacting of the aqueous fluoropolymer dispersion with sorbent is carried out at a temperature of about 5° C. to about 80° C. The temperature to be used will vary with the type of sorbent employed. For example, activated carbon is particularly effective at temperatures near room temperature, i.e., about 10 to about 30° C. Ion exchange membranes can be operated at somewhat higher temperatures, i.e., about 50 to about 70° C., to increase the rate of sorption.

The process of the invention is carried out in one embodiment by contacting the aqueous fluoropolymer dispersion with sorbent by mixing sorbent into the aqueous fluoropolymer dispersion and subsequently separating the sorbent from the dispersion. For example, a stirred tank containing a slurry of dispersion and sorbent can be used to achieve contacting of the sorbent with the dispersion followed by filtration to remove the sorbent. It is desirable to use sufficient sorbent so that contacting times are practical, e.g., about 5 minutes to about 4 hours.

In accordance with a preferred embodiment of the invention, contacting of the aqueous fluoropolymer dispersion with sorbent is carried out by passing aqueous fluoropolymer dispersion though a bed of sorbent. For example, a column filled with sorbent can be used to provide the fixed bed. Gravity flow of the dispersion thought the column can be employed or, if desired, the dispersion can be pumped though the column upwardly or downwardly. Multiple passes through the column can be used if desired.

For dispersions which are stabilized only by hydrocarbon surfactant which is removed by the sorbent, it is preferable that the sorbent not remove so much of the hydrocarbon surfactant that the dispersion becomes unstable and coagulates prematurely.

The process of the invention can be combined if desired with one or more other treatment processes which reduce thermally induced discoloration so that the additive effect of the treatments used provides the desired color reduction. Such other treatment processes can also be fluoropolymer dispersion treatments like the present invention or can be resin treatment processes performed after isolation of the fluoropolymer from the aqueous medium.

In accordance one preferred form of the process of the invention, the fluoropolymer resin after isolation from the aqueous dispersion medium is also post-treated, preferably by exposing the fluoropolymer resin to an oxidizing agent, to reduce thermally induced discoloration. The additive effect of the post-treatment in combination with contacting the aqueous dispersion to sorbent in accordance with the invention can provide an improvement over the reduction of thermally induced discoloration provided only by contacting the aqueous fluoropolymer dispersion with sorbent. The reduction of thermally induced discoloration measured by % change in L* on the CIELAB color scale provided by post-treatment in combination with contacting the aqueous fluoropolymer dispersion with sorbent is preferably at least about 10% greater than the % change in L* on the CIELAB color scale provided by only contacting the aqueous fluoropolymer dispersion with sorbent under the same conditions, more preferably at least about 20% greater, still more preferably at least about 30% greater, most preferably at least about 50% greater.

Post-treatment of the fluoropolymer resin dispersion can be accomplished by a variety of techniques. One preferred post-treatment comprises exposing the fluoropolymer resin to fluorine. Exposure to fluorine may be carried out with a variety of fluorine radical generating compounds but preferably exposure of the fluoropolymer resin is carried out by contacting the fluoropolymer resin with fluorine gas. Since the reaction with fluorine is very exothermic, it is preferred to dilute the fluorine with an inert gas such as nitrogen. The level of fluorine in the fluorine/inert gas mixture may be 1 to 100 volume % but is preferably about 5 to about 25 volume % because it is more hazardous to work with pure fluorine. For fluoropolymer resins in which the thermally induced discoloration is severe, the fluorine/inert gas mixture should be sufficiently dilute to avoid overheating the fluoropolymer and the accompanying risk of fire.

Heating the fluoropolymer resin during exposure to fluorine increases the reaction rate. Because the reaction of fluorine to reduce thermally induced discoloration is very exothermic, some or all of the desired heating may be provided by the reaction with fluorine. This post-treatment can be carried out with the fluoropolymer resin heated to a temperature above the melting point of the fluoropolymer resin or at a temperature below the melting point of the fluoropolymer resin.

For the process carried out below the melting point, the exposing of the fluoropolymer resin to fluorine is preferably carried out with the fluoropolymer resin heated to a temperature of about 20° C. to about 250° C.

In one embodiment, the temperature employed is about 150° C. to about 250° C. In one another embodiment, the temperature is about 20° C. to about 100° C. For PTFE fluoropolymer resins (including modified PTFE resins) which are not melt-processible, i.e., PTFE fine powders, it is desirable to carry the process below the melting point of the PTFE resin to avoid sintering and fusing the resin. Preferably, PTFE fine powder resins are heated to a temperature less than about 200° C. to avoid adversely affecting end use characteristics of the PTFE resin. In one preferred embodiment, the temperature is about 20° C. to about 100° C. For fluoropolymers which are melt-processible, the process can be carried out with the fluoropolymer heated to below or above the melting point of the fluoropolymer resin. Preferably, the process for a melt-processible resin is carried out with the fluoropolymer resin heated to above its melting point. Preferably, the exposing of the fluoropolymer resin to fluorine is carried out with the fluoropolymer resin heated to a temperature above its melting up to about 400° C.

For processing with the fluoropolymer resin heated to below the melting point, the fluoropolymer resin is preferably processed in particulate form to provide desirable reaction rates such as powders, flake, pellets or beads. Suitable apparatus for processing below the melting point are tanks or vessels which contain the fluoropolymer resin for exposure to a fluorine or fluorine/inert gas mixture while stirring, tumbling, or fluidizing the fluoropolymer resin for uniform exposure of the resin to fluorine. For example, a double cone blender can be used for this purpose. Equipment and methods useful for the removal of unstable end groups in melt-processible fluoropolymers, for example, those disclosed in Morgan et al., U.S. Pat. No. 4,626,587 and Imbalzano et al., U.S. Pat. No. 4,743,658, can be used to expose the fluoropolymer resin to fluorine at a temperature below its melting point. In general, more fluorine is necessary for reducing thermally induced discoloration to desirable level than is typically required for removing unstable end groups, for example, at least 2 times the amount required for removing unstable end groups can be required. The amount of fluorine required will be dependent upon the level of discoloration but it is usually desirable to employ a stoichiometric excess of fluorine.

For processing the fluoropolymer resin heated to above the melting point, exposure to fluorine can be accomplished by a variety of methods with reactive extrusion being a preferred method for the practice of this post-treatment. In reactive extrusion, exposure to fluorine is performed while the molten polymer is processed in a melt extruder. When fluoropolymer flake is processed by melt extrusion into chip or pellet is a convenient point in the manufacturing process to practice the process of this post-treatment. Various types of extruders such a single-screw or multi-screw extruders can be used. Combinations of extruders are also suitably used. Preferably, the extruder includes mixing elements to improve mass transfer between the gas and the molten fluoropolymer resin. For the practice of this post-treatment, extruders are suitably fitted with a port or ports for feeding fluorine or fluorine/inert gas mixture for contacting the fluoropolymer. A vacuum port for removing volatiles is also preferably provided. Equipment and methods useful for stabilizing melt-processible fluoropolymers, for example, those disclosed in Chapman et al., U.S. Pat. No. 6,838,545, Example 2, can be used to expose the fluoropolymer to fluorine at a temperature above its melting point. Similar to the process carried out below the melting point, more fluorine is generally necessary for reducing thermally induced discoloration to desirable level than is typically required for removing unstable end groups, for example, at least 2 times the amount required for removing unstable end groups can be required. The amount of fluorine required will be dependent upon the level of discoloration, but it is usually desirable to employ a stoichiometric excess of fluorine. In the event more residence time than is provided in an extruder is desired for the exposure to fluorine, a kneader such as a surface renewal type kneader as disclosed in Hiraga et al. U.S. Pat. No. 6,664,337 can be used to carry out the process of this post-treatment.

Another preferred post-treatment comprises heating the fluoropolymer resin to a temperature of about 160° C. to about 400° C. and exposing the heated fluoropolymer resin to an oxygen source. In one embodiment of this post-treatment, heating of the fluoropolymer is carried out by convection heating such as in an oven. Preferably, heat transfer gas employed in the oven is the oxygen source or includes the oxygen source as will be discussed below. The heat transfer gas may be circulated to improve heat transfer if desired and the heat transfer gas may include water vapor to increase its humidity.

This post-treatment is advantageously employed for fluoropolymer resin which is melt-processible. The process can be carried out with a melt-processible fluoropolymer resin heated to below or above the melting point of the fluoropolymer resin. Preferably, the process for a melt-processible resin is carried out with the fluoropolymer resin heated to above its melting point.

This post-treatment is also advantageously employed for PTFE fluoropolymer resins (including modified PTFE resins) which are not melt-processible. It is preferred for PTFE resins to be processed below their melting point. Most preferably, PTFE resins are heated to a temperature less than 200° C.

The fluoropolymer can be in various physical forms for processing in accordance with this post-treatment. For processing below the melting point of the fluoropolymer resin, the physical form of the fluoropolymer will have a greater impact on the time necessary to achieve a desired reduction in thermally induced discoloration. Preferably for processing below the melting point, the fluoropolymer resin is processed in finely divided form to promote exposure to the oxygen source such as by employing the powder recovered from isolation of the fluoropolymer, also called flake, prior to melt processing into chip or pellet. For processing above the melting point, the physical form of the fluoropolymer resin is usually less important since the fluoropolymer resin will melt and fuse when heating. Although chip or pellet can also be used for treatment above the melting point, the powder recovered from isolation of the fluoropolymer prior to melt processing into chip or pellet is suitably used. The fluoropolymer resin can be in wet or dry form. If wet fluoropolymer resin is used, drying of the wet fluoropolymer resin results as it is heated.

For this post-treatment, the fluoropolymer resin can be contained in an open container of suitable material such as aluminum, stainless steel, or high nickel alloy such as that sold under the trademark Monel®. Preferably, pans or trays are employed which have a shallow depth to promote exposure to and mass transfer of oxygen from the oxygen source into the fluoropolymer resin.

The post-treatment can be carried out such that the fluoropolymer resin is under static conditions or dynamic conditions. The process is preferably carried out with the fluoropolymer resin under static conditions if the fluoropolymer is processed above the melting point and is preferably carried out with the fluoropolymer resin under dynamic conditions if processed below the melting point. "Static conditions" means that the fluoropolymer is not subjected to agitation such as by stirring or shaking although the heat transfer gas for convection heating may be circulated as noted above. Under static conditions, some settling of the resin may occur or, if conducted above the melting point, some flow of the melted resin within the container may occur. "Dynamic conditions" means that the process is carried while moving the fluoropolymer resin such as by stirring or shaking or actively passing a heat transfer gas through the fluoropolymer resin which may additionally cause movement the fluoropolymer resin. Heat transfer and mass transfer can be facilitated by the use of dynamic conditions which can be provided by, for example, a fluidized bed reactor or by otherwise flowing the gas through the polymer bed.

As used for this post-treatment, "oxygen source" means any chemical source of available oxygen. "Available oxygen" means oxygen capable of reacting as an oxidizing agent. The oxygen source preferably is either the heat transfer gas or is a component of the heat transfer gas. Preferably, the oxygen source is air, oxygen rich gas, or ozone-containing gas. "Oxygen rich gas" means pure oxygen and gas mixtures containing greater than about 21% oxygen by volume, preferably oxygen enriched air. Preferably, oxygen rich gas contains at least about 22% oxygen by volume. "Ozone containing gas" means pure ozone and gas mixtures containing ozone, preferably ozone enriched air. Preferably, the content of ozone in the gas mixture is at least about 10 ppm ozone by volume. For example, when the oxygen source is air, an air oven can be used to carry out the process. Oxygen or ozone can be supplied to the air oven to provide an oxygen rich gas, i.e., oxygen enriched air, or ozone-containing gas, i.e., ozone enriched air, respectively.

The time necessary to carry out this post-treatment will vary with factors including the temperature employed, the oxygen source employed, the rate of circulation of the heat transfer gas, and the physical form of the fluoropolymer resin. In general, treatment times for the process carried out below the melting point of the fluoropolymer are significantly longer than those for processes carried out above the melting point. For example, fluoropolymer resin treated using air as the oxygen source below the melting point may require processing for about 1 to 25 days to achieve the desired color reduction. The time for a process carried out using air as the oxygen source above the melting point generally may vary from about 15 minutes to about 10 hours.

Resin treated above the melting point typically results in the formation of solid slabs of fluoropolymer resin which may be chopped into suitably-sized pieces to feed a melt extruder for subsequent processing.

Another preferred post-treatment comprises melt extruding the fluoropolymer resin to produce molten fluoropolymer resin and exposing the molten fluoropolymer resin to an oxygen source during the melt extruding. "Melt extruding" as used for this post-treatment means to melt the fluoropolymer resin and to subject the molten fluoropolymer resin to mixing of the fluoropolymer resin. Preferably, the melt extruding provides sufficient shear to provide effective exposure of the oxygen source with the molten fluoropolymer resin. To carry out melt extrusion for this post-treatment, various equipment can be used. Preferably, the molten fluoropolymer resin is processed in a melt extruder. Fluoropolymer flake after isolation is often processed by melt extrusion into chip or pellet and this is a convenient point in the manufacturing process to practice the process of this post-treatment. Various types of extruders such a single-screw or multi-screw extruder can be used. Combinations of extruders are also suitably used. Preferably, the melt extruder provides a high shear section such as by including kneading block sections or mixing elements to impart high shear to the molten fluoropolymer resin. In the event more residence time than can be provided in an extruder is desired, a kneader such as a surface renewal type kneader as disclosed in Hiraga et al. U.S. Pat. No. 6,664,337 can be used to carry out this post-treatment.

For the practice of the process of this post-treatment, extruders or kneaders are suitably fitted with a port or ports for injecting the oxygen source for exposure with the fluoropolymer. A vacuum port for removing volatiles is also preferably provided. Equipment and methods useful for stabilizing melt-processible fluoropolymers, for example, those disclosed in Chapman et al., U.S. Pat. No. 6,838,545, can be used to carry out the process of this post-treatment.

As used for this post-treatment, "oxygen source" means any chemical source of available oxygen. "Available oxygen" means oxygen capable of reacting as an oxidizing agent. Preferably, the oxygen source is air, oxygen rich gas, or ozone-containing gas. "Oxygen rich gas" means pure oxygen and gas mixtures containing greater than about 21% oxygen by volume, preferably oxygen enriched air. Preferably, oxygen rich gas contains at least about 22% oxygen by volume. "Ozone containing gas" means pure ozone and gas mixtures containing ozone, preferably ozone enriched air. Preferably, the content of ozone in the gas mixture is at least about 10 ppm ozone by volume.

In the practice of this post-treatment, the oxygen source can be injected to an appropriate port in the melt extruding equipment and the molten fluoropolymer resin is thereby exposed to the oxygen source. The location at which the molten polymer is exposed to oxygen source may be referred to as the reaction zone. In preferred melt extruders for the practice of this post-treatment having at least one high shear section provided with kneading blocks or mixing elements, the molten fluoropolymer resin is exposed to the oxygen source in the high shear section, i.e., the reaction zone is in a high shear section. Preferably, the process of this post-treatment is carried out in multiple stages, i.e., the extruder has more than one reaction zone for exposure of the molten fluoropolymer to oxygen source. The amount of oxygen source required will vary with the degree of thermally induced discoloration exhibited by the fluoropolymer resin. It is usually desirable to employ a stoichiometric excess of the oxygen source.

Another preferred post-treatment comprises exposing wet fluoropolymer resin to an oxygen source during drying. The wet fluoropolymer resin for use in this post-treatment is preferably undispersed fluoropolymer as separated from the dispersion during isolation of the fluoropolymer resin. Any of various equipment known for use in drying fluoropolymer resin can be used for this post-treatment. In such equipment a heated drying gas, typically air, is used as a heat transfer medium to heat the fluoropolymer resin and to convey away water vapor and chemicals removed from the fluoropolymer resin during drying. Preferably in accordance with this post-treatment, the drying gas employed is the oxygen source or includes the oxygen source as discussed below.

The process of this post-treatment can be carried out such that the fluoropolymer resin is dried under static conditions or dynamic conditions. "Static conditions" means that the fluoropolymer is not subjected to agitation such as by stirring or shaking during drying although drying in equipment such as tray drying in an oven result in circulation of the drying gas by convection. "Dynamic conditions" means that the process is carried while moving the fluoropolymer resin such as by stirring or shaking or actively passing a drying gas through the fluoropolymer resin which may additionally cause movement the fluoropolymer resin. Heat transfer and mass transfer can be facilitated by the use of dynamic conditions, for example, flowing the drying gas through the polymer bed. Preferably, the process of this post-treatment is carried out under dynamic conditions. Preferred equipment and process conditions for drying under dynamic conditions is disclosed by Egres, Jr. et al. U.S. Pat. No. 5,391,709, in which the wet fluoropolymer resin is deposited as a shallow bed on fabric and dried by passing heated air through the bed, preferably from top to bottom.

As used for this post-treatment, "oxygen source" means any chemical source of available oxygen. "Available oxygen" means oxygen capable of reacting as an oxidizing agent. Preferably, the oxygen source is air, oxygen rich gas, or ozone-containing gas. "Oxygen rich gas" means pure oxygen and gas mixtures containing greater than about 21% oxygen by volume, preferably oxygen enriched air. Preferably, oxygen rich gas contains at least about 22% oxygen by volume. "Ozone containing gas" means pure ozone and gas mixtures containing ozone, preferably ozone enriched air. Preferably, the content of ozone in the gas mixture is at least about 10 ppm ozone by volume.

One preferred oxygen source for practice of this post-treatment is ozone containing gas, preferably ozone enriched air. Ozone enriched air as the drying gas can be provided by employing an ozone generator which feeds ozone into the drying air as it is supplied to the drying apparatus used. Another preferred oxygen source is oxygen rich gas, preferably oxygen enriched air. Oxygen enriched air as the drying gas can be provided by feeding oxygen into the drying air as it is supplied to the drying apparatus used. Oxygen enriched air can also be provided by semipermeable polymeric membrane separation systems.

Temperatures of drying gas during drying can be in the range of about 100° C. to about 300° C. Higher temperature drying gases shorten the drying time and facilitate the reduction of thermally induced discoloration. However, temperatures of the drying gas should not cause the temperature of the fluoropolymer resin to reach or exceed its melting point which will cause the fluoropolymer to fuse. For melt-processible fluoropolymers, preferred drying gas temperatures are 160° C. to about 10° C. below the melting point of the fluoropolymer. The end use properties of PTFE resin can be adversely affected by temperatures well below its melting point. Preferably, PTFE resin is dried using drying gas at a temperature of about 100° C. to about 200° C., more preferably, about 150° C. to about 180° C.

The time necessary to carry out the process of this post-treatment will vary with factors including the thickness of the wet fluoropolymer resin being dried, the temperature employed, the oxygen source employed and the rate of circulation of the drying gas. When ozone containing gas is used as the oxygen source, the reduction of thermally induced discoloration can be accomplished during normal drying times, preferably in the range of about 15 minutes to 10 hours. If desired, the post-treatment can be continued after the fluoropolymer resin is dry for the purposes of reducing thermally induced discoloration.

In a preferred form of this post-treatment, the exposing of the wet fluoropolymer resin to an oxygen source during drying is carried out in the presence of alkali metal salt. In this form of the invention, it is preferred for the oxygen source to be ozone containing gas.

Any of variety of alkali metal salts can be used. The anion in the alkali metal salt preferably is non-reactive with components of the dispersion although hydroxide can be beneficial since higher pH values can promote reduction of discoloration. Preferred alkali metal salts are sodium salts, lithium salts and potassium salts with potassium salts being most preferred. Examples of suitable alkali metal salts are KCL, $K_2CO_3$, $K_2SO_4$, NaOH, NaCl, LiOH and LiCl.

The presence of alkali metal salt during drying is preferably provided by adding alkali metal salt to the aqueous medium prior to separating the wet fluoropolymer resin from the aqueous medium. For example, the alkali metal salt can be added before coagulation or after coagulation but before the aqueous medium is removed. Preferably, the alkali metal salt is added prior to coagulation.

When added to the aqueous medium, the amount of alkali metal salt can vary depending upon the type of salt added, the severity of the discoloration and other conditions employed in the process. Preferably, the amount of alkali metal salt added to the dispersion prior to coagulation is about 5 ppm to about 50,000 ppm based on the weight of dry fluoropolymer, more preferably about 50 ppm to about 25,000 ppm, and most preferably about 150 ppm to about 10,000 ppm.

The process of the invention is useful for fluoropolymer resin which exhibits thermally induced discoloration which may range from mild to severe. The process is especially useful for aqueous fluoropolymer dispersion which contains hydrocarbon surfactant which causes the thermally induced discoloration, preferably aqueous fluoropolymer dispersion that is polymerized in the presence of hydrocarbon surfactant.

The process of the invention is especially useful when the fluoropolymer resin prior to treatment exhibits significant thermally induced discoloration compared to equivalent commercial fluoropolymers. The invention is advantageously employed when the fluoropolymer resin has an initial thermally induced discoloration value ($L^*_i$) at least about 4 L units on the CIELAB color scale below the L* value of equivalent fluoropolymer resin of commercial quality manufactured using ammonium perfluorooctanoate fluorosurfactant. The invention is more advantageously employed when the $L^*_i$ value is at least about 5 units below the L* value of such equivalent fluoropolymer resin, even more advantageously employed when the $L^*_i$ value is at least 8 units below the L* value of such equivalent fluoropolymer resin, still more advantageously employed when the $L^*_i$ value is at least 12 units below the L* value of such equivalent fluoropolymer resin, and most advantageously employed when the $L^*_i$ value is at least 20 units below the L* value of such equivalent fluoropolymer resin.

After the aqueous fluoropolymer dispersion is treated in accordance with the process of the invention, normal procedures for isolating the polymer as discussed above can be used. The resulting fluoropolymer resin is suitable for end use applications appropriate for the particular type of fluoropolymer resin. Fluoropolymer resin produced by employing the present invention exhibits reduced thermally induced discoloration without detrimental effects on end use properties.

TEST METHODS

Raw Dispersion Particle Size (RDPS) of polymer particles is measured using a Zetasizer Nano-S series dynamic light scattering system manufactured by Malvern Instruments of Malvern, Worcestershire, United Kingdom.

Samples for analysis are diluted to levels recommended by the manufacturer in 10×10×45 mm polystyrene disposable cuvettes using deionized water that has been rendered substantially free of particles by passing it through a sub-micron filter. The sample is placed in the Zetasizer for determination of Dv(50). Dv(50) is the median particle size based on volumetric particle size distribution, i.e. the particle size below which 50% of the volume of the population resides.

The melting ($T_m^1$) of melt-processable fluoropolymers is measured by Differential Scanning calorimeter (DSC) according to the procedure of ASTM D 4591-07. PTFE homopolymer melting point, the melting point the first time the polymer is heated, also referred to as the first heat, is determined by DSC according to the method of ASTM D-4591-07. The melting temperature reported is the peak temperature of the endotherm on first melting for both melt-processable fluoropolymers and PTFE homopolymer.

Comonomer content is measured using a Fourier Transform Infrared (FTIR) spectrometer according to the method disclosed in U.S. Pat. No. 4,743,658, col. 5, lines 9-23 with the following modifications. The film is quenched in a hydraulic press maintained at ambient conditions. The comonomer content is calculated from the ratio of the appropriate peak to the fluoropolymer thickness band at 2428 cm$^{-1}$ calibrated using a minimum of three other films from resins analyzed by F-19 NMR to establish true comonomer content. For instance, the % HFP content is determined from the absorbance of the HFP band at 982 cm$^{-1}$.

Melt flow rate (MFR) of the melt-processable fluoropolymers are measured according to ASTM D 1238-10, modified as follows: The cylinder, orifice and piston tip are made of a corrosion-resistant alloy, Haynes Stellite 19, made by Haynes Stellite Co. The 5.0 g sample is charged to the 9.53 mm (0.375 inch) inside diameter cylinder, which is maintained at 372° C.±1° C., such as disclosed in ASTM D 2116-07 for FEP and ASTM D 3307-10 for PFA. Five minutes after the sample is charged to the cylinder, it is extruded through a 2.10 mm (0.0825 inch) diameter, 8.00 mm (0.315 inch) long square-edge orifice under a load (piston plus weight) of 5000 grams. Other fluoropolymers are measured according to ASTM D 1238-10 at the conditions which are standard for the specific polymer.

Measurement of Thermally Induced Discoloration

1) Color Determination

The L* value of fluoropolymer resin samples is determined using the CIELAB color scale, details of which are published in CIE Publication 15.2 (1986). CIE L*a*b* (CIELAB) is the color space specified by the International Commission on Illumination (French Commission internationale de l'éclairage). It describes all the colors visible to the human eye. The three coordinates of CIELAB represent the lightness of the color (L*), its position between red/magenta and green (a*), and its position between yellow and blue (b*).

2) PTFE Sample Preparation and Measurement

The following procedure is used to characterize the thermally induced discoloration of PTFE polymers including modified PTFE polymers. 4.0 gram chips of compressed PTFE powder are formed using a Carver stainless steel pellet mold (part #2090-0) and a Carver manual hydraulic press (model 4350), both manufactured by Carver, Inc. of Wabash, Indiana. In the bottom of the mold assembly is placed a 29 mm diameter disk of 0.1 mm thick Mylar® film. 4 grams of dried PTFE powder are spread uniformly within the mold opening poured into the mold and distributed evenly. A second 29 mm disk is placed on top of the PTFE and the top plunger is placed in the assembly. The mold assembly is placed in the press and pressure is gradually applied until 8.27 MPa (1200 psi) is attained. The pressure is held for 30 seconds and then released. The chip mold is removed from the press and the chip is removed from the mold. Mylar® films are pealed from the chip before subsequent sintering. Typically for each polymer sample, two chips are molded.

An electric furnace is heated is heated to 385° C. Chips to be sintered are placed in 4 inch×5 inch (10.2 cm×12.7 cm) rectangular aluminum trays which are 2 inches (5.1 cm) in depth. The trays are placed in the furnace for 10 minutes after which they are removed to ambient temperature for cooling.

4 gm chips processed as described above are evaluated for color using a HunterLab Color Quest XE made by Hunter Associates Laboratory, Inc. of Reston, Va. The Color Quest XE sensor is standardized with the following settings, Mode: RSIN, Area View: Large and Port Size: 2.54 cm. The instrument is used to determine the L* value of fluoropolymer resin samples using the CIELAB color scale.

For testing, the instrument is configured to use CIELAB scale with D65 Illuminant and 10° Observer. The L* value reported by this colorimeter is used to represent developed color with L* of 100 indicating a perfect reflecting diffuser (white) and L* of 0 representing black.

An equivalent fluoropolymer resin of commercial quality manufactured using ammonium perfluorooctanoate fluorosurfactant is used as the standard for color measurements. For the Examples in this application illustrating the invention for PTFE fluoropolymer, an equivalent commercial qualtity PTFE product made using ammonium perfluorooctanoate fluorosurfactant as the dispersion polymerization surfactant is TEFLON® 601A. Using the above measurement process, the resulting color measurement for TEFLON® 601A is $L*_{Std-PTFE}$=87.3

3) Melt-Processible Fluoropolymers Sample Preparation and Measurement

The following procedure is used to characterize discoloration of melt-processable fluoropolymers, such as FEP and PFA, upon heating. A 10.16 cm (4.00 inch) by 10.16 cm (4.00 inch) opening is cut in the middle of a 20.32 cm (8.00 inch) by 20.32 cm (8.00 inch) by 0.254 mm (0.010 inch) thick metal sheet to form a chase. The chase is placed on a 20.32 cm (8.00 inch) by 20.32 cm (8.00 inch) by 1.59 mm (1/16 inch) thick molding plate and covered with Kapton® film that is slightly larger than the chase. The polymer sample is prepared by reducing size, if necessary, to no larger than 1 mm thick and drying. 6.00 grams of polymer sample is spread uniformly within the mold opening. A second piece of Kapton® film that is slightly larger than the chase is placed on top of the sample and a second molding plate, which has the same dimensions as the first, is placed on top of the Kapton® film to form a mold assembly. The mold assembly is placed in a P—H—I 20 ton hot press model number SP-210C-X4A-21 manufactured by Pasadena Hydraulics Incorporated of El Monte, California that is set at 350° C. The hot press is closed so the plates are just contacting the mold assembly and held for 5 minutes. The pressure on the hot press is then increased to 34.5 MPa (5,000 psi) and held for an additional 1 minute. The pressure on the hot press is then increased from 34.5 MPa (5,000 psi) to 137.9 MPa (20,000 psi) over the time span of 10 seconds and held for an additional 50 seconds after reaching 137.9 MPa (20,000 psi). The mold assembly is removed from the hot press, placed between the blocks of a P—H—I 20 ton hot press model number P-210H manufactured by Pasadena Hydraulics Incorporated that is maintained at ambient temperature, the pressure is increased to 137.9 MPa (20,000 psi), and the mold assembly is left in place for 5 minutes to cool. The mold assembly is then removed from the ambient temperature press, and the sample film is removed from the mold assembly. Bubble-free areas of the sample film are selected and 2.86 cm (1⅛ inch) circles are stamped out using a 1⅛ inch arch punch manufactured by C. S. Osborne and Company of Harrison, N.J. Six of the film circles, each of which has a nominal thickness of 0.254 mm (0.010 inch) and nominal weight of 0.37 gram are assembled on top of each other to create a stack with a combined weight of 2.2+/-0.1 gram.

The film stack is placed in a HunterLab ColorFlex spectrophotometer made by Hunter Associates Laboratory, Inc. of Reston, Va., and the L* is measured using a 2.54 cm (1.00 inch) aperture and the CIELAB scale with D65 Illuminant and 10° Observer.

An equivalent fluoropolymer resin of commercial quality manufactured using ammonium perfluorooctanoate fluorosurfactant is used as the standard for color measurements. For the Examples in this application illustrating the invention for FEP fluoropolymer resin, an equivalent commercial quality FEP resin made using ammonium perfluorooctanoate fluorosurfactant as the dispersion polymerization surfactant is DuPont TEFLON® 6100 FEP. Using the above measurement process, the resulting color measurement for DuPont TEFLON® 6100 FEP is $L^*_{Std\text{-}FEP}=79.7$.

4) % change in L* with respect to the standard is used to characterize the change in thermally induced discoloration of the fluoropolymer resin after treatment as defined by the following equation % change in $L^*=(L^*_t-L^*_i)/(L^{*Std}-L^*_i)\times 100$ $L^*_i$=Initial thermally induced discoloration value, the measured value for L on the CIELAB scale for fluoropolymer resins prior to treatment to reduce thermally induced discoloration measured using the disclosed test method for the type of fluoropolymer.

$L^*_t$=Treated thermally induced discoloration value, the measured value for L on the CIELAB scale for fluoropolymer resins after treatment to reduce thermally induced discoloration measured using the disclosed test method for the type of fluoropolymer.

Standard for PTFE: measured $L^*_{Std\text{-}PTFE}=87.3$
Standard for FEP: measured $L^*_{Std\text{-}FEP}=79.7$

EXAMPLES

Apparatus for Drying of PTFE Polymer

A laboratory dryer for simulating commercially dried PTFE Fine Powder is constructed as follows: A length of 4 inch (10.16 cm) stainless steel pipe is threaded on one end and affixed with a standard stainless steel pipe cap. In the center of the pipe cap is drilled a 1.75 inch (4.45 cm) hole through which heat and air source is introduced. A standard 4 inch (10.16 cm) pipe coupling is sawed in half along the radial axis and the sawed end of one piece is butt welded to the end of the pipe, opposite the pipe cap. Overall length of this assembly is approximately 30 inches (76.2 cm) and the assembly is mounted in the vertical position with the pipe cap at the top. For addition of a control thermocouple, the 4 inch pipe assembly is drilled and tapped for a ¼ inch (6.35 mm) pipe fitting at a position 1.75 inch (4.45 cm) above the bottom of the assembly. A ¼ inch (6.35 mm) male pipe thread to ⅛ inch (3.175 mm) Swagelok fitting is threaded into the assembly and drilled through to allow the tip of a ⅛ inch (3.175 mm) J-type thermocouple to be extended through the fitting and held in place at the pipe's radial center. For addition of a other gases such as ozone enriched air, the 4 inch (10.16 cm) pipe assembly is drilled and tapped for a ¼ inch (6.35 mm) pipe fitting at a position 180° from the thermocouple port and higher at 3.75 inch (9.5 cm) above the bottom of the assembly. A ¼ inch (6.35 mm) male pipe thread to ¼ inch (6.35 mm) Swagelok fitting is threaded into the assembly and drilled through to allow the open end of a ¼ inch (6.35 mm) stainless steel tube to be extended through the fitting and held in place at the pipe's radial center. The entire pipe assembly is wrapped with heat resistant insulation that can easily withstand 200° C. continuous duty.

The dryer bed assembly for supporting polymer is constructed as follows: A 4 inch (10.16 cm) stainless steel pipe nipple is sawed in half along the radial axis and onto the sawed end of one piece is tack welded stainless steel screen with 1.3 mm wire size and 2.1 mm square opening. Filter media of polyether ether ketone (PEEK) or Nylon 6,6 fabric is cut into a 4 inch (10.16 cm) disk and placed on the screen base. A 4 inch (10.16 cm) disk of stainless steel screen is placed on top of the filter fabric to hold it securely in place. Fabrics used include a Nylon 6,6 fabric and PEEK fabric having the characteristics described in U.S. Pat. No. 5,391,709. In operation, approximately ¼ inch (6.35 mm) of polymer is placed uniformly across the filter bed and the dryer bed assembly is screwed into the bottom of the pipe assembly.

The heat and air source for this drying apparatus is a Master heat gun, model HG-751B, manufactured by Master Appliance Corp. of Racine, Wis. The end of this heat gun can be snuggly introduced through and supported by the hole in the cap at the top of the pipe assembly. Control of air flow is managed by adjusting a damper on the air intake of the heat gun. Control of temperature is maintained by an ECS Model 800-377 controller, manufactured by Electronic Control Systems, Inc of Fairmont W. Va. Adaptation of the controller to the heat gun is made as follows: The double pole power switch of the heat gun is removed. All power to the heat gun is routed through the ECS controller. The blower power is supplied directly from the ECS controller on/off switch. The heater circuit is connected directly to the ECS controller output. The thermocouple on the pipe assembly which is positioned above the polymer bed serves as the controller measurement device.

The apparatus described above is typically used to dry PTFE Fine Powder at 170° C. to 180° C. and can easily maintain that temperature to within ±1° C.

Apparatus for Dynamic Drying of FEP Polymer

Equipment similar in design to that described in Apparatus for Drying of PTFE Polymer is used except the scale is increased so the dryer bed assembly is 8 inch (20.32 cm) in diameter and the stainless steel screen is a USA standard testing sieve number 20 mesh modified by the addition of three evenly spaced nozzles with a centerline 3.0 cm above the polymer bed. The nozzles can be used to introduce additional gasses to the drying air. The apparatus can easily maintain the air temperature to within ±1° C. of 180° C.

Fluoropolymer Preparation

PTFE—Preparation of Hydrocarbon Stabilized PTFE Dispersion

A PTFE dispersion is prepared by the methods described in U.S. Patent Application Publication No. US2012/0116003

A1. Solids content of the dispersion is 25.2 wt % solids and the raw dispersion particle size (RDPS) is 144 nm. The stabilizer used in polymerization is sodium dodecyl sulfate (SDS) and 1396 parts by weight of SDS per million parts of dry polymer are added to the dispersion. Thermal properties of the dry polymer are measured by DSC. The melting point and heat of fusion on first heat is 334.6° C. and 76.8 J/gm, respectively.

Isolation of PTFE Dispersion

To a clean glass resin kettle having internal dimensions 17 cm deep and 13 cm in diameter is charged 600 gm of 15 wt % dispersion. The dispersion is agitated with a variable speed, IKA Works, Inc., RW20 digital overhead stirrer affixed with a 6.9 cm diameter, rounded edge three blade impeller having a 45° downward pumping pitch. The following sequence is executed until the dispersion has completely coagulated as indicated by the separation of white PTFE polymer from a clear aqueous phase: At time zero, agitation speed is set at 265 revolutions per minute (RPM) and 20 ml of a 20 wt % aqueous solution of ammonium carbonate is slowly added to the resin kettle. At 1 minute from time zero, the agitator speed is raised to 565 RPM and maintained until the dispersion is completely coagulated. Once coagulated, the clear aqueous phase is removed by suction and 600 ml of cold (approximately 6° C.), deionized water is added. The slurry is agitated at 240 RPM for 5 minutes until agitation is halted and the wash water removed from the resin kettle. This washing procedure is repeated two more times with the final wash water being separated from the polymer by vacuum filtration as indicated below.

A ceramic filtration funnel (10 cm internal diameter) is placed on a vacuum flask with rubber sealing surface. A 30 cm by 30 cm lint free nylon filter cloth is placed in the filtration funnel and the washed polymer and water is poured into the funnel. A vacuum is pulled on the vacuum flask and once the wash water is removed, 1200 ml of additional deionized water is poured over the polymer and pulled through the polymer into the vacuum flask. Polymer thus coagulated, washed and isolated is removed from the filter cloth for further processing.

FEP Polymerization Example 1

Preparation of Hydrocarbon Stabilized TFE/HFP Dispersion

A TFE/HFP copolymer (FEP) dispersion is prepared by the methods described in U.S. Patent Application Publication No. US2012/0116003 A1. Solids content of the dispersion is 17.56 wt % and Dv(50) raw dispersion particle size (RDPS) is 209.2 nm. The TFE/HFP copolymer (FEP) has a melt flow rate (MFR) of 25.0 g/10 min, a HFP content of 11.25 wt %, and a melting point on first heat of 263.50° C. The stabilizer used in polymerization is sodium dodecyl sulfate (SDS) and 814 parts by weight SDS per million parts of dry polymer are added to the dispersion.

FEP Polymerization Example 2

Preparation of Hydrocarbon Stabilized TFE/HFP Dispersion

A TFE/HFP copolymer (FEP) dispersion is prepared by the methods described in U.S. Patent Application Publication No. US2012/0116003 A1. Solids content of the dispersion is 18.14 wt % and Dv(50) raw dispersion particle size (RDPS) is 174.2 nm. The TFE/HFP copolymer (FEP) has a melt flow rate (MFR) of 13.3 g/10 min, an HFP content of 11.15 wt %, and a melting point on first heat of 263.31° C. The stabilizer used in polymerization is sodium dodecyl sulfate (SDS) and 641 parts by weight SDS per million parts of dry polymer are added to the dispersion.

FEP Polymerization Example 3

Preparation of Hydrocarbon Stabilized TFE/HFP Dispersion

A TFE/HFP copolymer (FEP) dispersion is prepared by the methods described in U.S. Patent Application Publication No. US2012/0116003 A1. Solids content of the dispersion is 16.39 wt % and Dv(50) raw dispersion particle size (RDPS) is 166 nm. The TFE/HFP copolymer (FEP) has a melt flow rate (MFR) of 46.9 g/10 min, a HFP content of 11.37 wt %, and a melting point on first heat of 261.91° C. The stabilizer used in polymerization is sodium dodecyl sulfate (SDS) and 2278 parts by weight SDS per million parts of dry polymer are added to the dispersion.

Isolation of FEP Dispersion

The TFE/HFP copolymer (FEP) dispersion for physical property measurement is coagulated by freezing the dispersion at −30° C. for 16 hours. The dispersion is thawed and the water is separated from the solids by filtering through a 150 micron mesh filter bag model NM0150P1SHS manufactured by The Strainrite Companies of Auburn, Me. The solids are dried for 40 hours in a circulating air oven set at 150° C. to produce a dry powder.

Thermally Induced Discoloration

Dried polymer is characterized as described above in the Test Methods—Measurement of Thermally Induced Discoloration as applicable to the type of polymer used in the following Examples.

Comparative Example 1

PTFE 358 gm of aqueous PTFE dispersion is diluted to 15 wt % solids with deionized water and isolated as described above (Isolation of PTFE Dispersion). Approximately 55 gm of the wet polymer thus obtained is then dried at 170° C. for 1 hour using the PTFE drier described above in Apparatus for Drying of PTFE Polymer with the addition of ozone enriched air. Ozone is produced by passing 100 cc/min of air into a ClearWater Tech, LLC Model CD-10 ozone generator which is operated at the full power setting. Dried polymer is characterized for thermally induced discoloration as described in the Test Methods Measurement of Thermally Induced Discoloration for PTFE. The measured color is shown in Table 1. The L* value of 38.4 is nearly 49 L units below the L* value of PTFE fluoropolymer resin of commercial quality manufactured using ammonium perfluorooctanoate fluorosurfactant.

Example 1

PTFE

A 200 ml glass burette with approximately 4.6 cm inner diameter and a stopcock is used as a treatment column by inserting 4 cm of glass wool at the bottom of the burette and pouring 50 g of Calgon DSR—C8X30 activated carbon on top of the glass wool. The column is flushed with 1,000 ml of deionized water. 358 gm of aqueous PTFE dispersion is diluted to 15 wt % solids with deionized water. pH of the dilute dispersion is 2.5. The dilute dispersion is continuously poured into the burette and the stopcock adjusted to allow the dispersion to slowly flow through the column. Typical time for processing 600 ml of 15 wt % aqueous dispersion is approximately 15 to 20 minutes. pH of the once treated dispersion measures 5.1. The dispersion is run through the column one more time and the final pH measures 7.0. The dispersion is isolated, dried and characterized for thermally induced discoloration as described in Comparative Example 1—PTFE. The measured color is shown in Table 1.

Example 2

PTFE

The procedure of Example 1—PTFE is repeated except that the dispersion is passed through the activated carbon column a total of three times and the final dispersion pH is 7.0. The measured color is shown in Table 1.

Example 3

PTFE

The procedure of Example 1—PTFE is repeated except that the dispersion is passed through Calgon Filtrasorb 400 activated column. The final dispersion pH is 9.1. The measured color is shown in Table 1.

TABLE 1

| Activated Carbon - PTFE | | |
| --- | --- | --- |
| Example | L* | % Change in L* |
| Comparative Example 1 - PTFE | 38.4 | |
| Example 1 - PTFE | 49.2 | 22.1 |
| Example 2 - PTFE | 55.7 | 35.4 |
| Example 3 - PTFE | 55.5 | 35.0 |

Comparative Example 2

FEP—No Treatment

Aqueous FEP Dispersion Polymerized as Described in FEP

Polymerization Example 1 is diluted to 5.1 weight percent solids with deionized water. pH of the dilute dispersion is 2.47. A portion of the dispersion is coagulated by freezing the dispersion at −30° C. for 16 hours. The dispersion is thawed and the water is separated from the solids by filtering through a 150 micron mesh filter bag model NM0150P1SHS manufactured by The Strainrite Companies of Auburn, Me.

A portion of the solids is dried for 67 hours in a circulating air oven set at 150° C. to produce a dry powder. A sample of dried powder is molded to produce color films as described in the Test Methods section above as Measurement of Thermally Induced Discoloration for Melt-Processible Fluoropolymers to establish the base value of L* ($L^*_i$=46.3) for untreated color, which is more than 33 L units below the L* value of FEP fluoropolymer resin of commercial quality manufactured using ammonium perfluorooctanoate fluorosurfactant.

Example 4

FEP—Activated Carbon Treatment

A 500 ml glass burette with an inner diameter of approximately 3.8 cm and a stopcock is used as a treatment column by inserting 2.5 cm of glass wool at the bottom of the burette and pouring 150 g of Calgon DSR—C8X30 from Calgon Carbon Corporation of Pittsburgh, Pa. activated carbon on top of the glass wool. The column is flushed with 2,000 ml of deionized water. 1,000 ml of FEP dispersion diluted to 5.1 weight percent solids prepared in Comparative Example 2—FEP is poured through the column. The first 25 ml of the dispersion is discarded and the rest is collected. The dispersion is run through the column four more times repeating this procedure. The pH after five passes is 5.32.

The dispersion is coagulated by freezing the dispersion at −30° C. for 16 hours. The dispersion is thawed and the water is separated from the solids by filtering through a 150 micron mesh filter bag model NM0150P1SHS manufactured by The Strainrite Companies of Auburn, Me.

A portion of the solids is dried for 67 hours in a circulating air oven set at 150° C. to produce a dry powder. The dried powder is molded to produce color films as described in the Test Methods section above as Measurement of Thermally Induced Discoloration for Melt-Processible Fluoropolymers. Resulting value L* obtained for this polymer is 64.9 with a % change in L* of 55.7% indicating a much improved color after treatment. The measured color is shown in Table 2.

TABLE 2

| Activated Carbon - FEP | | |
| --- | --- | --- |
| Example | L* after drying | % change in L* |
| Comparative Example 2 - FEP | 46.3 | |
| Example 4 - FEP | 64.9 | 55.7 |

Example 5

PTFE

The procedure of Comparative Example 1—PTFE is repeated except that 0.0671 gm of KCl is added to the dispersion and well mixed prior to isolation of the dispersion. The measured color is compared to Comparative Example 1—PTFE in Table 3.

Example 6

PTFE

The procedure of Example 1—PTFE is repeated except that 0.0671 gm of KCl is added to the dispersion and well mixed prior to processing the dispersion through the activated carbon bed. Final dispersion pH measures 7.3. The measured color is compared to Comparative Example 1—PTFE in Table 3.

Example 7

PTFE

The procedure of Comparative Example 1—PTFE is repeated except that 0.1454 gm of KCl is added to the dispersion and well mixed prior to isolation of the dispersion. The measured color is compared to Comparative Example 1—PTFE in Table 3.

Example 8

PTFE

The procedure of Example 2—PTFE is repeated except that 0.1454 gm of KCl is added to the dispersion and well mixed prior to processing the dispersion through the activated carbon bed. Final dispersion pH measures 7.2. The measured color is compared to Comparative Example 1—PTFE in Table 3.

TABLE 3

Activated Carbon & Alkali Metal Salt - PTFE

| Example | L* | % Chg. in L* | gm KCl |
|---|---|---|---|
| Comparative Example 1 - PTFE | 38.4 | | |
| Example 5 - PTFE | 46.0 | 15.5 | 0.0671 |
| Example 6 - PTFE | 53.9 | 31.7 | 0.0671 |
| Example 7 - PTFE | 46.3 | 16.2 | 0.1454 |
| Example 8 - PTFE | 77.2 | 79.3 | 0.1454 |

Example 9

PTFE

A 200 ml glass burette with approximately 4.6 cm inner diameter and a stopcock is used as a treatment column by inserting 4 cm of glass wool at the bottom of the burette and pouring 9 cm of the ion exchange resin, Siemens A-244 UPS(OH), on top of the glass wool. The column is flushed with 1,000 ml of deionized water. 358 gm of aqueous PTFE dispersion is diluted to 15 wt % solids with deionized water. pH of the dilute dispersion is 2.5. The dilute dispersion is continuously poured into the burette and the stopcock adjusted to allow the dispersion to slowly flow through the column. Typical time for processing 600 ml of 15 wt % aqueous dispersion is approximately 15 to 20 minutes. pH of the once treated dispersion measures 4.0. The dispersion is run through the column one more time and the final pH measures 9.7. The resulting dispersion is isolated, dried and characterized for thermally induced discoloration as described in Comparative Example 1—PTFE. The measured color is shown in Table 4.

TABLE 4

Ion Exchange Resin - PTFE

| Example | L* | % Change in L* |
|---|---|---|
| Comparative Example 1 - PTFE | 38.4 | |
| Example 9 - PTFE | 45.1 | 13.7 |

Comparative Example 3

FEP—No Treatment

Aqueous FEP dispersion polymerized as described in FEP Polymerization Example 2 is diluted to 4.9 weight percent solids with deionized water. The pH of the dilute dispersion is 2.72. A portion of the dispersion is coagulated by freezing the dispersion at −30° C. for 16 hours. The dispersion is thawed and the water is separated from the solids by filtering through a 150 micron mesh filter bag model NM0150P1SHS manufactured by The Strainrite Companies of Auburn, Me.

A portion of the solids is dried for 21 hours in a circulating air oven set at 150° C. to produce a dry powder. A sample of dried powder is molded to produce color films as described in the Test Methods section above as Measurement of Thermally Induced Discoloration for Melt-Processible Fluoropolymers to establish the base value of L* ($L^*_i$=40.4) for untreated color, which is more than 39 L units below the L* value of FEP fluoropolymer resin of commercial quality manufactured using ammonium perfluorooctanoate fluorosurfactant.

Example 10

FEP—Ion Exchange Treatment

Siemens A-244 UPS(OH) ion exchange resin from Siemens Industry, Inc.—Water Technologies Business Unit Rockford, Ill. is prepared by combining 40 g of ion exchange resin and 1600 ml deionized water in a 2000 ml jacketed glass reactor with internal diameter of 13.3 cm (5¼ inches). An impeller with four 3.18 cm (1.25 inch) long flat blades set at a 45° angle is used to stir the contents for 30 minutes at 120 rpm. The ion exchange resin is separated from the water by filtering through a 150 micron mesh filter bag model NM0150P1SHS manufactured by The Strainrite Companies of Auburn, Me. This procedure is repeated again.

1000 ml of FEP dispersion diluted to 4.9 weight percent solids prepared in Comparative Example 3—FEP is preheated to 59.4° C. in a 60° C. water bath. The preheated dispersion is transferred to a 2000 ml jacketed glass reactor with internal diameter of 13.3 cm (5¼ inches), which has 60° C. water circulating through the reactor jacket. 70 g of the Siemens A-244 UPS(OH) ion exchange resin pretreated as described above and an impeller with four 3.18 cm (1.25 inch) long flat blades set at a 45° angle are placed in the reactor. The agitator is set at 120 rpm. After 30 minutes of mixing, the treatment is ended by stopping the agitator, discontinuing the hot water circulation, and then removing the dispersion from the reactor. The ion exchange resin is separated from the dispersion by filtering through a 150 micron mesh filter bag model NM0150P1SHS manufactured by The Strainrite Companies of Auburn, Me. The pH of the dispersion after treatment is 9.16. The dispersion is coagulated by freezing the dispersion at −30° C. for 16 hours. The dispersion is thawed and the water is separated from the solids by filtering through a 150 micron mesh filter bag model NM0150P1SHS manufactured by The Strainrite Companies of Auburn, Me.

A portion of the solids is dried for 21 hours in a circulating air oven set at 150° C. to produce a dry powder. The dried powder is molded to produce color films as described in the Test Methods section above as Measurement of Thermally Induced Discoloration for Melt-Processible Fluoropolymers. Resulting value L* obtained for this polymer is 49.6 with a % change in L* of 23.4% indicating improved color after treatment. The measured color is shown in Table 5.

Example 11

FEP—Ion Exchange Treatment with Ozone Drying

Another portion of the solids from Example 10—FEP—Ion Exchange Treatment is dried using the apparatus described in Apparatus for Dynamic Drying of FEP Polymer. The apparatus is used to dry 18 grams dry weight of FEP for two hours with 180° C. air, which is supplemented with ozone produced by passing 2000 cc/min of air into a ClearWater Tech, LLC Model CD-10 ozone generator that is operated at the full power setting. The dried powder is molded to produce color films as described in the Test Methods section above as Measurement of Thermally Induced Discoloration for Melt-Processible Fluoropolymers. Resulting value L* obtained for this polymer is 79.4 with a % change in L* of 99.2% indicating significantly improved color when combining ozone drying with sorption treatment. The measured color is shown in Table 5.

TABLE 5

Ion Exchange Resin - FEP

| Example | L* after drying | % change in L* |
|---|---|---|
| Comparative Example 3 - FEP | 40.4 | |
| Example 10 - FEP - Standard Drying | 49.6 | 23.4 |
| Example 11 - FEP - Ozone Drying | 79.4 | 99.2 |

Comparative Example 4

PTFE

The procedure of Comparative Example 1—PTFE is repeated except that drying conditions are modified as follows: Drying temperature is raised from 170° C. to 180° C. and air flow to the ozone generator is raised from 100 cc/min to 200 cc/min. The measured color is shown in Table 6. The L* value of 50.6 is nearly 37 L units below the L* value of PTFE fluoropolymer resin of commercial quality manufactured using ammonium perfluorooctanoate fluorosurfactant.

Example 12

PTFE 58 grams of Grace Davison Grade 408 Silica Gel is allowed to hydrate by exposing to atmospheric moisture for 24 hours followed by slurrying in deionized water. A 200 ml glass burette with approximately 4.6 cm inner diameter and a stopcock is used as a treatment column by inserting 4 cm of glass wool at the bottom of the burette and pouring the silica gel on top of the glass wool. The column is flushed with 1,000 ml of deionized water. 358 gm of aqueous PTFE dispersion is diluted to 15 wt % solids with deionized water. pH of the dilute dispersion is 2.5. The dilute dispersion is continuously poured into the burette and the stopcock adjusted to allow the dispersion to slowly flow through the column. Typical time for processing 600 ml of 15 wt % aqueous dispersion is approximately 15 to 20 minutes. The dispersion is run through the column a total of three time and the final pH measures 3.4. The dispersion is isolated, dried and characterized for thermally induced discoloration as described in Comparative Example 4

PTFE

The measured color is shown in Table 6.

TABLE 6

Silica Gel - PTFE

| Example | L* | % Change in L* |
|---|---|---|
| Comparative Example 4 - PTFE | 50.6 | |
| Example 12 - PTFE | 55.8 | 14.2 |

Example 13

PTFE

A 200 ml glass burette with approximately 4.6 cm inner diameter and a stopcock is used as a treatment column by inserting 4 cm of glass wool at the bottom of the burette and pouring 9 cm of Amberlite XAD-2 polymeric resin on top of the glass wool. The column is flushed with 1,000 ml of deionized water. 358 gm of aqueous PTFE dispersion is diluted to 15 wt % solids with deionized water. pH of the dilute dispersion is 2.5. The dilute dispersion is continuously poured into the burette and the stopcock adjusted to allow the dispersion to slowly flow through the column. Typical time for processing 600 ml of 15 wt % aqueous dispersion is approximately 15 to 20 minutes. The dispersion is run through the column two more times and the final pH measures 3.3. The resulting dispersion is isolated, dried and characterized for thermally induced discoloration as described in Comparative Example 1—PTFE. The measured color is shown in Table 7.

TABLE 7

Amberlite XAD-2 - PTFE

| Example | L* | % Change in L* |
|---|---|---|
| Comparative Example 1 - PTFE | 38.4 | |
| Example 13 - PTFE | 46.2 | 16.0 |

Example 14

PTFE

The procedure of Example 13—PTFE is repeated except that the Amberlite XAD-2 polymeric resin is replaced with Amberlite XAD16 polymeric resin. The dispersion is run through the column a total of three times and the final pH measures 3.4. The resulting dispersion is isolated, dried and characterized for thermally induced discoloration as described in Comparative Example 1—PTFE. The measured color is shown in Table 8.

TABLE 8

Amberlite XAD16 - PTFE

| Example | L* | % Change in L* |
|---|---|---|
| Comparative Example 1 - PTFE | 38.4 | |
| Example 14 - PTFE | 47.6 | 18.8 |

Example 15

PTFE

The procedure of Example 13—PTFE is repeated except that the Amberlite XAD-2 polymeric resin is replaced with Amberlite XAD1180 polymeric resin. The dispersion is run through the column a total of three times and the final pH measures 3.3. The resulting dispersion is isolated, dried and characterized for thermally induced discoloration as described in Comparative Example 1—PTFE. The measured color is shown in Table 9.

TABLE 9

Amberlite XAD1180 - PTFE

| Example | L* | % Change in L* |
|---|---|---|
| Comparative Example 1 - PTFE | 38.4 | |
| Example 15 - PTFE | 51.5 | 26.8 |

Comparative Example 5

FEP—No Treatment

Aqueous FEP dispersion polymerized as described in FEP Polymerization Example 3 is diluted to 5.0 weight percent solids with deionized water. pH of the dilute dispersion is 2.54. A portion of the dispersion is coagulated by freezing the dispersion at −30° C. for 16 hours. The dispersion is thawed and the water is separated from the solids by filtering through a 150 micron mesh filter bag model NMO150P1SHS manufactured by The Strainrite Companies of Auburn, Me.

A portion of the solids is dried for 42 hours in a circulating air oven set at 150° C. to produce a dry powder. A sample of dried powder is molded to produce color films as described in the Test Methods section above as Measurement of Thermally Induced Discoloration for Melt-Processible Fluoropolymers to establish the base value of L* ($L^*_i$=19.5) for untreated color, which is more than 60 L units below the L* value of FEP fluoropolymer resin of commercial quality manufactured using ammonium perfluorooctanoate fluorosurfactant.

Example 16

FEP—Diatomaceous Earth Treatment 122.9 cm³ of Celite® 545 coarse filter aid made from calcined diatomaceous earth and distributed by Sigma Aldrich of St. Louis, Mo. is pretreated by mixing with 1000 ml deionized water on a stir plate for 10 minutes. A 500 ml glass burette with an inner diameter of approximately 3.8 cm and a stopcock is used as a treatment column by inserting 6.0 cm of glass wool at the bottom of the burette. The mixture of diatomaceous earth and deionized water is poured on top of the glass wool. The column is flushed with 1,000 ml of deionized water. 1,000 ml of FEP dispersion diluted to 5.0 weight percent solids prepared in Comparative Example 5—FEP is poured through the column. The pH after passing through the column is 10.32.

The dispersion is coagulated by freezing the dispersion at −30° C. for 16 hours. The dispersion is thawed and the water is separated from the solids by filtering through a 150 micron mesh filter bag model NMO150P1SHS manufactured by The Strainrite Companies of Auburn, Me.

A portion of the solids is dried for 42 hours in a circulating air oven set at 150° C. to produce a dry powder. The dried powder is molded to produce color films as described in the Test Methods section above as Measurement of Thermally Induced Discoloration for Melt-Processible Fluoropolymers. Resulting value L* obtained for this polymer is 51.2 with a % change in L* of 52.7% indicating a much improved color after treatment. The measured color is shown in Table 10.

TABLE 10

Diatomaceous Earth - FEP

| Example | L* after drying | % change in L* |
|---|---|---|
| Comparative Example 5 - FEP | 19.5 | |
| Example 16 - FEP | 51.2 | 52.7 |

Example 17

FEP—Molecular Sieve Treatment 122.9 cm³ of Grace Davison Zeolite A molecular sieve material produced by Grace Davison of Baltimore, Md. is pretreated by mixing with 1000 ml deionized water on a stir plate for 10 minutes. A 500 ml glass burette with an inner diameter of approximately 3.8 cm and a stopcock is used as a treatment column by inserting 6.0 cm of glass wool at the bottom of the burette. The mixture of molecular sieve material and deionized water is poured on top of the glass wool. The column is flushed with 1,000 ml of deionized water. 1,000 ml of FEP dispersion diluted to 5.0 weight percent solids prepared in Comparative Example 5—FEP is poured through the column. The dispersion is run through the column four more times. The pH after five passes is 4.98.

The dispersion is coagulated by freezing the dispersion at −30° C. for 16 hours. The dispersion is thawed and the water is separated from the solids by filtering through a 150 micron mesh filter bag model NM0150P1SHS manufactured by The Strainrite Companies of Auburn, Me.

A portion of the solids is dried for 42 hours in a circulating air oven set at 150° C. to produce a dry powder. The dried powder is molded to produce color films as described in the Test Methods section above as Measurement of Thermally Induced Discoloration for Melt-Processible Fluoropolymers. Resulting value L* obtained for this polymer is 39.6 with a % change in L* of 33.4% indicating improved color after treatment. The measured color is shown in Table 11.

TABLE 11

Molecular Sieve - FEP

| Example | L* after drying | % change in L* |
|---|---|---|
| Comparative Example 5 - FEP | 19.5 | |
| Example 17 - FEP | 39.6 | 33.4 |

What is claimed is:

1. Process for reducing thermally induced discoloration of fluoropolymer resin, said fluoropolymer resin produced by polymerizing in the presence of hydrocarbon surfactant which causes said thermally induced discoloration and wherein all of the monovalent substituents on the carbon atoms of the hydrocarbon surfactant are hydrogen and wherein said fluoropolymer resin has an initial thermally induced discoloration value ($L_i$) about 20 L units on the CIELAB color scale below the L value of equivalent fluoropolymer resin of commercial quality manufactured using ammonium perfluorooctanoate fluorosurfactant, said process comprising:
polymerizing fluoromonomer in the presence of said hydrocarbon surfactant in an aqueous dispersion medium to form aqueous fluoropolymer dispersion;
contacting the aqueous fluoropolymer dispersion with sorbent; and
isolating said fluoropolymer from said aqueous medium to obtain said fluoropolymer resin.

2. The process of claim 1 wherein said process reduces thermally induced discoloration by at least about 10% as measured by % change in L* on the CIELAB color scale.

3. The process of claim 1 wherein the solids content of said dispersion during said contacting with sorbent is about 2 weight percent to about 60 weight percent.

4. The process of claim 1 wherein said contacting the aqueous fluoropolymer dispersion with sorbent is carried out at a temperature of about 5° C. to about 80° C.

5. The process of claim 1 wherein said contacting of said aqueous fluoropolymer dispersion with sorbent is carried out by mixing sorbent into said aqueous fluoropolymer dispersion and subsequently separating said sorbent from said dispersion.

6. The process of claim 1 wherein said contacting of said aqueous fluoropolymer dispersion with sorbent is carried out by passing said aqueous fluoropolymer dispersion though a bed of sorbent.

7. The process of claim 1 wherein said sorbent is selected from the group consisting of activated carbon, ion exchange resin, silica gel, polymer sorbents, diatomaceous earth and zeolites.

8. The process of claim 1 wherein said sorbent comprises activated carbon.

9. The process of claim 1 wherein said sorbent comprises ion exchange resin.

10. The process of claim 1 further comprising post-treating the fluoropolymer resin to reduce thermally induced discoloration after isolation from said aqueous dispersion medium.

11. The process of claim 10 wherein said post-treating comprises exposing the fluoropolymer resin to oxidizing agent.

12. The process of claim 11 wherein said isolating said fluoropolymer from said aqueous medium to obtain said fluoropolymer resin comprises separating wet fluoropolymer resin from the aqueous medium and drying to produce said fluoropolymer resin and wherein said post treating by exposing the fluoropolymer resin to oxidizing agent comprises exposing said wet fluoropolymer resin to an oxygen source during drying.

13. The process of claim 12 wherein said oxygen source is ozone containing gas.

* * * * *